US008380952B2

(12) United States Patent
Watanabe

(10) Patent No.: US 8,380,952 B2
(45) Date of Patent: Feb. 19, 2013

(54) STORAGE SYSTEM AND DATA STORAGE METHOD USING STORAGE SYSTEM WHICH DECIDES SIZE OF DATA TO OPTIMIZE THE TOTAL OF DATA SIZE TRANSFER EFFICIENCY

(75) Inventor: Yasuo Watanabe, Machida (JP)

(73) Assignees: Hitachi, Ltd., Tokyo (JP); Hitachi Computer Peripherals Co., Ltd., Kanagawa (JP)

( * ) Notice: Subject to any disclaimer, the term of this patent is extended or adjusted under 35 U.S.C. 154(b) by 640 days.

(21) Appl. No.: 12/526,618

(22) PCT Filed: May 29, 2009

(86) PCT No.: PCT/JP2009/060306
§ 371 (c)(1),
(2), (4) Date: Aug. 10, 2009

(87) PCT Pub. No.: WO2010/137183
PCT Pub. Date: Dec. 2, 2010

(65) Prior Publication Data
US 2011/0264875 A1 Oct. 27, 2011

(51) Int. Cl.
*G06F 12/16* (2006.01)
*G06F 11/14* (2006.01)
(52) U.S. Cl. ................................. 711/162; 711/E12.103
(58) Field of Classification Search .......... None
See application file for complete search history.

(56) References Cited

U.S. PATENT DOCUMENTS

| 5,596,707 | A | 1/1997 | Ohta |
| 6,385,706 | B1 | 5/2002 | Ofek et al. |
| 6,629,110 | B2 * | 9/2003 | Cane et al. .................... 707/703 |
| 2004/0034752 | A1 | 2/2004 | Ohran |
| 2007/0027936 | A1 | 2/2007 | Stakutis |

FOREIGN PATENT DOCUMENTS

| EP | 0899662 A1 | 3/1999 |
| JP | 11212875 | 8/1999 |
| WO | 0152116 A1 | 7/2001 |

\* cited by examiner

*Primary Examiner* — Kevin Verbrugge
(74) *Attorney, Agent, or Firm* — Brundidge & Stanger, P.C.

(57) ABSTRACT

A secondary subsystem reads first differential data recorded in a magnetic tape device into a magnetic disk device, and manages such data based on second differential data that was created based on the read first differential data and differential management information. Then, whether differential data exists in partial data is determined based on the differential management information, and, if such differential data exists, the partial data is read into a cache memory, and differential data is applied to the partial data. Meanwhile, if differential data does not exist, the partial data is read into the buffer. Moreover, new full data is recorded by writing the partial data, which was read into the cache memory or the buffer, onto the magnetic tape device in parallel with other read processing.

11 Claims, 26 Drawing Sheets

FIG.5

| | 500 |
|---|---|
| OLD FULL DATA MANAGEMENT INFORMATION | |

| MAGNETIC DISK DEVICE NUMBER (501) | MAGNETIC TAPE NUMBER (502) |
|---|---|
| 100 | 11 |
| 101 | 15 |
| : | : |

DIFFERENTIAL DATA MANAGEMENT INFORMATION

| MAGNETIC DISK DEVICE NUMBER | MAGNETIC TAPE NUMBER | MAGNETIC TAPE DEVICE NUMBER | BLOCK COUNT |
|---|---|---|---|
| 100 | 31 | 200 | 10 |
| 101 | NULL | NULL | NULL |
| : | : | : | : |

| | 700 |
|---|---|
| NEW FULL DATA MANAGEMENT INFORMATION | |
| 701 | 702 |
| MAGNETIC DISK DEVICE NUMBER | MAGNETIC TAPE NUMBER |
| 100 | 11 |
| 101 | 15 |
| : | : |

FIG.8

DIFFERENTIAL DATA DURING SYNTHESIS MANAGEMENT INFORMATION 800

| MAGNETIC DISK DEVICE NUMBER 801 | MAGNETIC TAPE NUMBER 802 | MAGNETIC TAPE DEVICE NUMBER 803 | BLOCK COUNT 804 |
|---|---|---|---|
| 100 | 41 | 300 | 5 |
| 101 | NULL | NULL | 0 |
| : | : | : | |

FIG.9

MAGNETIC TAPE MANAGEMENT INFORMATION

| MAGNETIC TAPE NUMBER | USAGE STATUS |
|---|---|
| 1 | IN USE |
| 2 | NOT IN USE |
| : | : |

FIG.10

| MAGNETIC TAPE DEVICE MANAGEMENT INFORMATION ||
|---|---|
| MAGNETIC TAPE DEVICE NUMBER | USAGE STATUS |
| 1 | IN USE |
| 2 | NOT IN USE |
| : | : |

FIG.11

| | 1100 |
|---|---|
| OPERATIONAL STATUS MANAGEMENT INFORMATION | |

| MAGNETIC DISK DEVICE NUMBER (1101) | OPERATIONAL STATUS (1102) |
|---|---|
| 100 | SYNTHESIS PROCESSING |
| 101 | NORMAL PROCESSING |
| : | : |

FIG.12

PER-BLOCK DIFFERENTIAL MANAGEMENT INFORMATION 1200

| BLOCK NUMBER 1201 | DIFFERENTIAL STATUS 1202 |
|---|---|
| 0 | 0 |
| 1 | 0 |
| 2 | 1 |
| 3 | 0 |
| : | : |

FIG.13

| \  | \  | \  | \  | 1300 |  |
|---|---|---|---|---|---|
| TRANSFER BLOCK GROUP MANAGEMENT INFORMATION ||||||
| 1301 | 1302 | 1303 | 1304 | 1305 | 1306 |
| TRANSFER BLOCK SIZE | TRANSFER BLOCK GROUP NUMBER | CORRESPONDING BLOCK | DIFFERENTIAL STATUS | TRANSFER BLOCK GROUP COUNT WITH DIFFERENTIAL | TRANSFER BLOCK GROUP COUNT WITHOUT DIFFERENTIAL |
| 4 BLOCKS | 0 | BLOCKS 0 TO 3 | 0 | 1 | 3 |
|  | 1 | BLOCKS 4 TO 7 | 0 |  |  |
|  | 2 | BLOCKS 8 TO 11 | 1 |  |  |
|  | 3 | BLOCKS 12 TO 15 | 0 |  |  |
|  | : | : | : |  |  |
| 8 BLOCKS | 0 | BLOCKS 0 TO 7 | 1 | 1 | 3 |
|  | 1 | BLOCKS 8 TO 15 | 0 |  |  |
|  | 2 | BLOCKS 16 TO 23 | 0 |  |  |
|  | 3 | BLOCKS 24 TO 31 | 0 |  |  |
|  | : | : | : |  |  |
| : | : | : | : | : | : |

FIG.14

TRANSFER COST COEFFICIENT MANAGEMENT INFORMATION 1400

| TRANSFER BLOCK SIZE | FIRST TRANSFER COST COEFFICIENT | SECOND TRANSFER COST COEFFICIENT |
|---|---|---|
| 4 BLOCKS | 1.0 | 0.5 |
| 8 BLOCKS | 0.8 | 0.4 |
| 16 BLOCKS | 0.6 | 0.3 |
| 32 BLOCKS | 0.4 | 0.2 |
| : | : | : |

FIG.15

TRANSFER COST MANAGEMENT INFORMATION 1500

| TRANSFER BLOCK SIZE | TRANSFER COST |
|---|---|
| 4 BLOCKS | 123. 8 |
| 8 BLOCKS | 98. 2 |
| 16 BLOCKS | 82. 3 |
| 32 BLOCKS | 103. 5 |
| : | : |

1501  1502

STORAGE SYSTEM AND DATA STORAGE METHOD USING STORAGE SYSTEM WHICH DECIDES SIZE OF DATA TO OPTIMIZE THE TOTAL OF DATA SIZE TRANSFER EFFICIENCY

TECHNICAL FIELD

The present invention relates to a storage system, and in particular relates to a storage system for backing up data of a random access-type memory device to a sequential access-type memory device, and to a data storage method using such storage system.

BACKGROUND ART

As a storage apparatus for storing data, known is a type of randomly accessing the target area of a memory medium, and a type that can only access the target area sequentially. A magnetic disk device is a representative example of the former type, and a magnetic tape device is a representative example of the latter type.

Although a magnetic disk device has a high bit cost, it yields an advantage of being able to position the recording/reproducing head at the target area of a memory medium within the scope of several milliseconds to several ten milliseconds. Meanwhile, although a magnetic tape device takes more than several seconds to several ten seconds to achieve the above, it yields an advantage in that the bit cost is low.

Thus, the remote copy system described in Japanese Patent Laid-Open Publication No. H11-212875 applies a magnetic disk device to a storage apparatus of a primary subsystem, and applies a magnetic tape device to a storage apparatus of a secondary storage apparatus subsystem.

The primary subsystem of the foregoing system records data that was received from a host system on a magnetic disk, and also transfers such data to the secondary subsystem. The secondary subsystem records the received data as differential data on a magnetic tape. If the amount of differential data exceeds a predetermined value, the secondary subsystem synthesizes the old full data and differential data recorded on the magnetic tape to create new full data, and records the new full data on the magnetic tape. Moreover, if a failure occurs in a magnetic disk and data is lost, the secondary subsystem synthesizes the full data and differential data recorded on the magnetic tape to create new full data, and transfers the new full data to the primary subsystem.

RELATED ART DOCUMENTS

Patent Document

Patent Document 1

Japanese Patent Laid-Open Publication No. H11-212875

DISCLOSURE OF THE INVENTION

If the remote copy system described in Japanese Patent Laid-Open Publication No. H11-212875 attempts to back up or restore data, the secondary subsystem needs to perform the following series of processing; namely, reading the full data from a sequential access-type storage apparatus into a random access-type storage apparatus, subsequently synthesizing the read full data with differential data to create new full data, and thereafter writing the new full data into the sequential access-type storage apparatus. This entailed a problem of much time being required until the creation of the new full data.

Thus, an object of the present invention is to provide a storage system and a data storage method capable of shortening the time required for synthesizing the full data with differential data even upon applying a sequential access-type storage apparatus to a memory medium to be used in the backup or restoration of the full data stored in a random access-type storage apparatus.

In order to achieve the foregoing object, the storage system and the data storage method using such storage system according to the present invention are characterized in that, upon creating new backup data while sequentially reading old backup data stored in a first sequential access-type memory device and synthesizing differential data with the read data, if there is differential in the read data, the read data is temporarily stored in a cache memory and synthesized with the differential data, and the synthesized data is stored in a second sequential access-type memory device; and if there is no differential in the read data, the read data is stored in the second sequential-type memory medium via an interface to the sequential access-type memory device.

According to the present invention, it is possible to provide a storage system and a data storage method capable of shortening the time required for synthesizing the full data with differential data even upon applying a sequential access-type storage apparatus to a memory medium to be used in the backup or restoration of the full data stored in a random access-type storage apparatus.

BRIEF DESCRIPTION OF THE DRAWINGS

FIG. 5 is a diagram showing the data structure of old full data management information;

FIG. 6 is a diagram showing the data structure of differential data management information;

FIG. 7 is a diagram showing the data structure of new full data management information;

FIG. 8 is a diagram showing the data structure of differential data during synthesis processing management information;

FIG. 9 is a diagram showing the data structure of magnetic tape management information;

FIG. 10 is a diagram showing the data structure of magnetic tape device management information;

FIG. 11 is a diagram showing the data structure of operational status management information;

FIG. 12 is a diagram showing the data structure of per-block differential management information;

FIG. 13 is a diagram showing the data structure of transfer block group management information;

FIG. 14 is a diagram showing the data structure of transfer cost coefficient management information;

FIG. 15 is a diagram showing the data structure of transfer cost management information;

BEST EMBODIMENT FOR CARRYING OUT THE INVENTION

Figure 1:
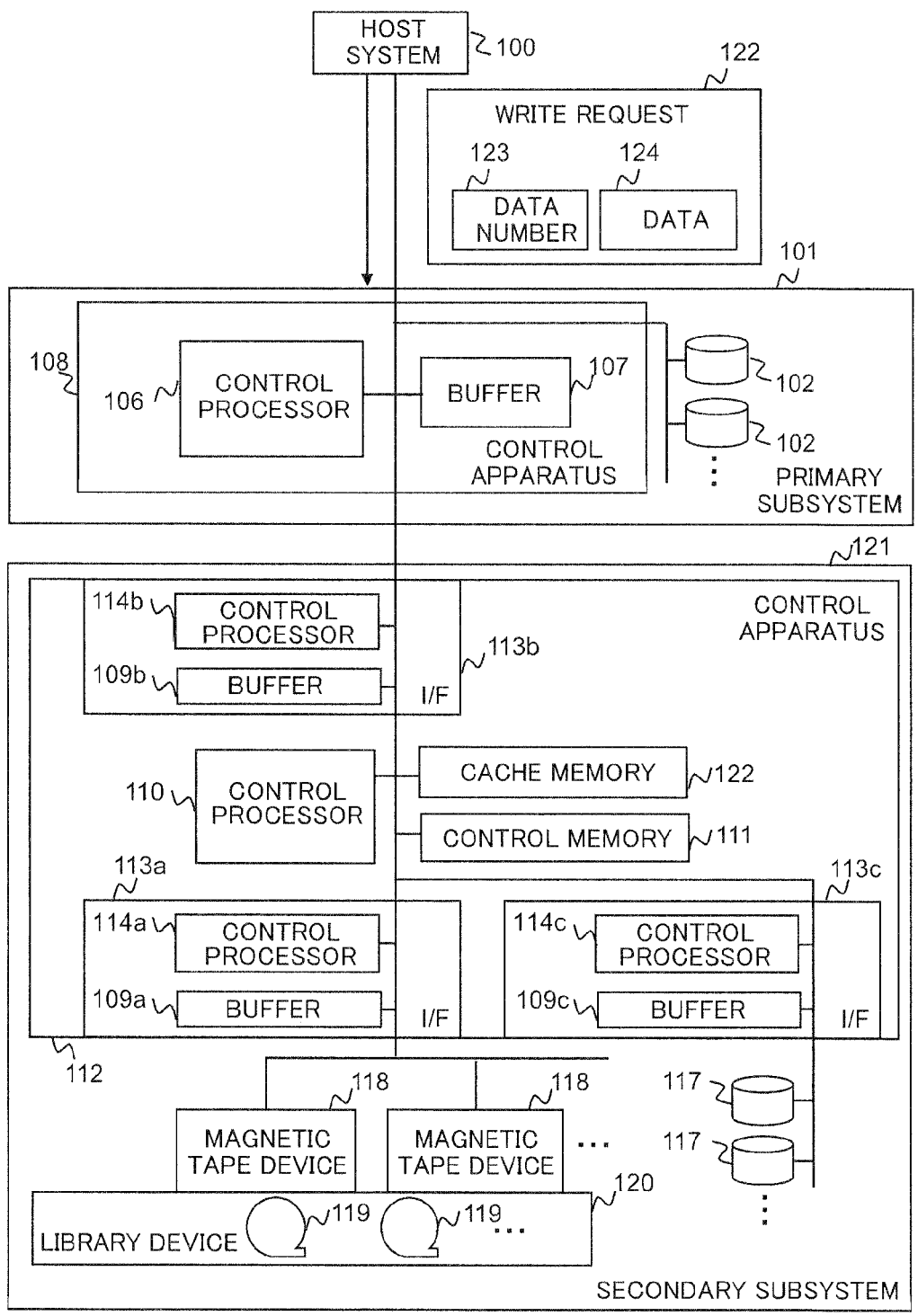
FIG. 1 is an overall configuration diagram according to a first embodiment of the present invention.

Embodiments of the present invention are now explained with reference to the attached drawings. FIG. 1 is a hardware block configuration diagram showing a first embodiment of a storage system configured from a host system 100, a primary subsystem 101, and a secondary subsystem 121. The secondary subsystem 121 is used for backing up or restoring the primary subsystem 101. The secondary subsystem records differential of a write request from the host system to the primary subsystem, synthesizes or applies the differential data to the full data that was previously backed up or restored to newly create backup data, and stores this in a sequential access-type recording medium. The secondary subsystem is, for example, a storage system of a remote site.

The host system 100 and the primary subsystem 101 are connected and the primary subsystem 101 and the secondary subsystem 121 are connected, respectively, to enable the sending and receiving of information and commands. Needless to say, the host system 100 may also be connected to the secondary subsystem 121.

In addition to issuing a write request 122 to the primary subsystem 101, the host system 100 also issues a read request and other requests. The write request 122 comprises data 124 and a data number 123 for identifying such data 124. The data number 123 also contains information regarding in which magnetic disk device 102 the data 124 is to be recorded.

The primary subsystem 101 comprises a control apparatus 108, and a magnetic disk device 102 configured from a plurality of memory devices. The control apparatus 108 comprises a control processor 106, and a buffer 107. The control processor 106 executes the various processing steps 201 to 203 shown in FIG. 2.

The buffer 107 is used for temporarily storing the data number 123 and the data 124. The magnetic disk device 102 records and reproduces the data 124 according to a request from the control processor 106. Each of the plurality of magnetic disk devices 102 is assigned a number for identifying each other.

The secondary subsystem 121 comprises a control apparatus 112, a magnetic disk device 117, a magnetic tape device 118, a library device 120, and a magnetic tape 119.

The control apparatus 112 comprises an interface (I/F) 113a to the magnetic tape device 118, an interface (I/F) 113b, an interface (I/F) 113c to the magnetic disk device 117, a control processor 110, a control memory 111, and a cache memory 122. Each interface (I/F) includes a buffer and a control processor as shown in FIG. 1.

Figure 2:
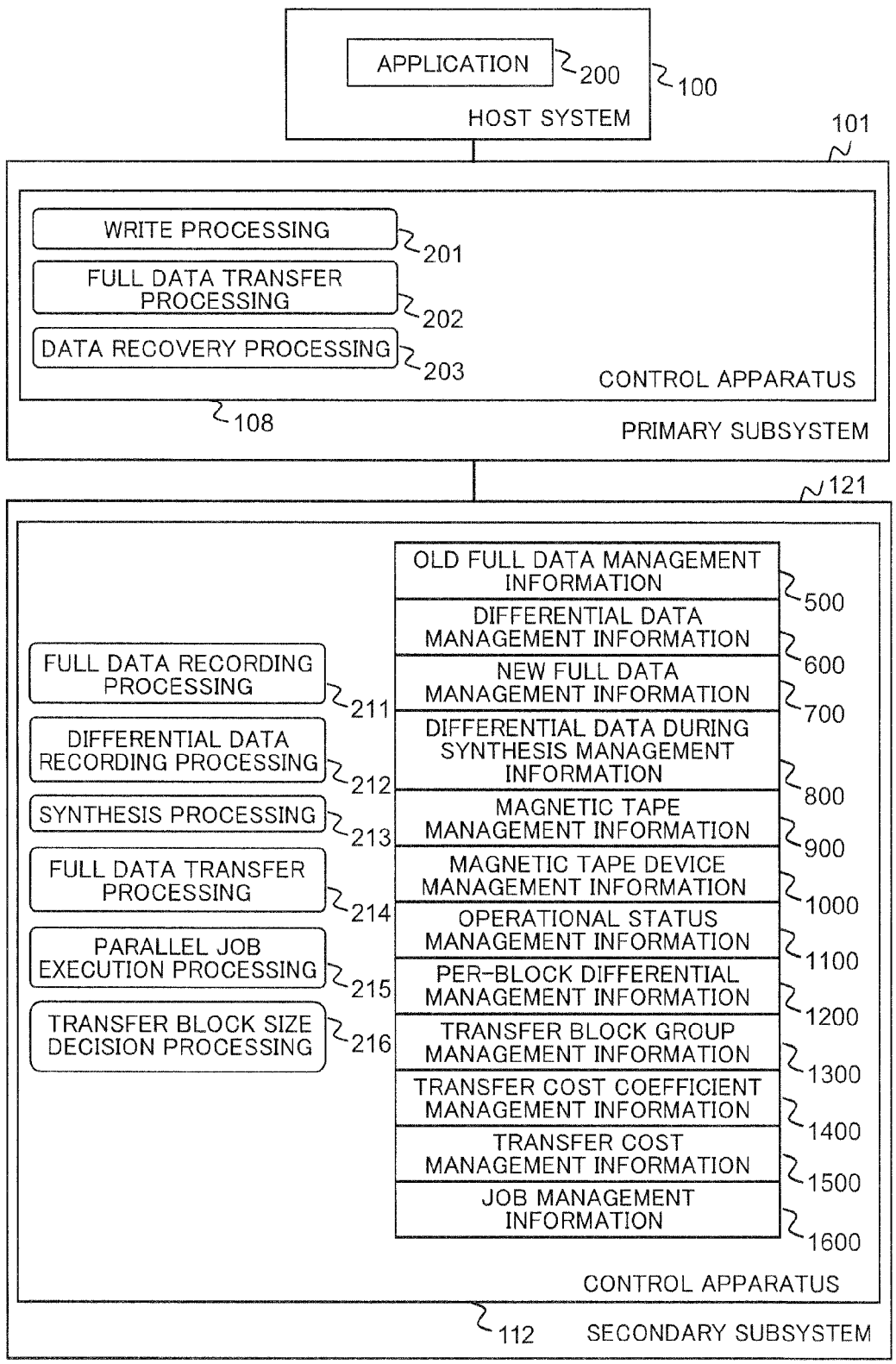
FIG. 2 is a program configuration diagram according to the first embodiment of the present invention.

The control processor 110 executes the various processing steps 211 to 216 of FIG. 2. The control memory 111 stores information that is necessary for the control processor 110 to execute the various processing steps. The cache memory 122 temporarily stores the data number 123 and the data 124, and the block 301 and the block 400. The control processor 110 is able to perform update processing to the data of the cache memory 122. When the control apparatus 112 reads data from the magnetic tape device 118, the buffer 109a temporarily stores data.

The buffer located within the interface is primarily used for smoothly performing the data transfer, and only communication data only passes therethrough, and data in the cache memory is not overwritten as with a cache memory.

The magnetic disk device 117 records and reproduces the data 124 in the location that is designated by the data number 123 of the magnetic disk according to a request from the control processor 110. The magnetic tape device 118 includes a function of recording and reproducing the data number 123 and the data 124 in the magnetic tape 119, a function of rewinding the magnetic tape 119, and a function of fast-forwarding the magnetic tape 119 according to a request from the control processor 110. Moreover, the magnetic tape device 118 includes a function of automatically rewinding the magnetic tape 119 upon mounting or demounting the magnetic tape 119 onto or from the magnetic tape device 118.

Each of the plurality of magnetic tape devices 118 is assigned a number for identifying each other. The library device 120 houses a plurality of magnetic tapes 119, and has a function of mounting the designated magnetic tape 119 onto the designated magnetic tape device 118 and demounting the designated magnetic tape device 118 from the magnetic tape 119 according to a request from the control processor 110. Each of the plurality of magnetic tapes 119 is assigned a number for identifying each other.

FIG. 2 is a functional block diagram of the information processing system shown in FIG. 1. The control processor 106 of the control apparatus 108 executes write processing 201, full data transfer processing 202, and data recovery processing 203.

The control processor 110 of the control apparatus 112 executes full data recording processing 211, differential data recording processing 212, synthesis processing 213, full data transfer processing 214, parallel job execution processing 215, and transfer block size decision processing 216.

The control memory 111 of the control apparatus 112 stores old full data management information 500, differential data management information 600, new full data management information 700, differential data during synthesis management information 800, magnetic tape management information 900, magnetic tape device management information 1000, operational status management information 1100, per-block differential management information 1200, transfer block group management information 1300, transfer cost coefficient management information 1400, transfer cost management information 1500, and job management information 1600.

Figure 3:
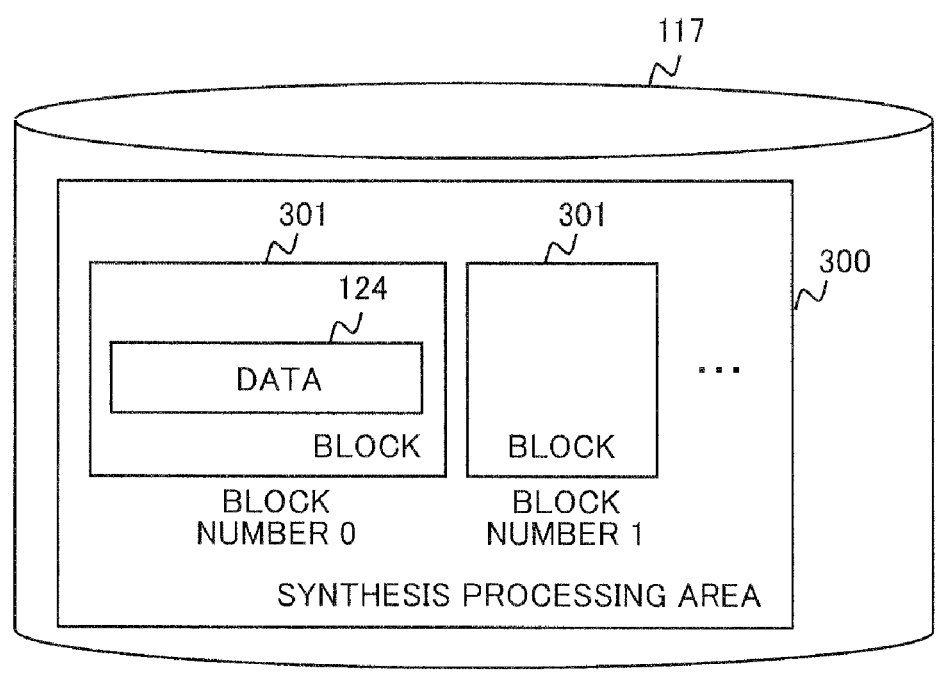
FIG. 3 is a diagram showing a storage area of a magnetic disk device.

FIG. 3 shows a storage area of the magnetic disk device 117. The storage area of the magnetic disk device 117 includes a synthesis processing area 300. The synthesis processing area 300 stores a plurality of blocks 301. Each block 301 is assigned a block number. The block number is incremented by one from the top such as 0, 1, 2, . . . . Each block 301 is uniquely identified based on the block number. Each block 301 includes one data 124. By designating the block number, the control processor 110 is able to directly access the respective blocks. This is a random access.

Figure 4:
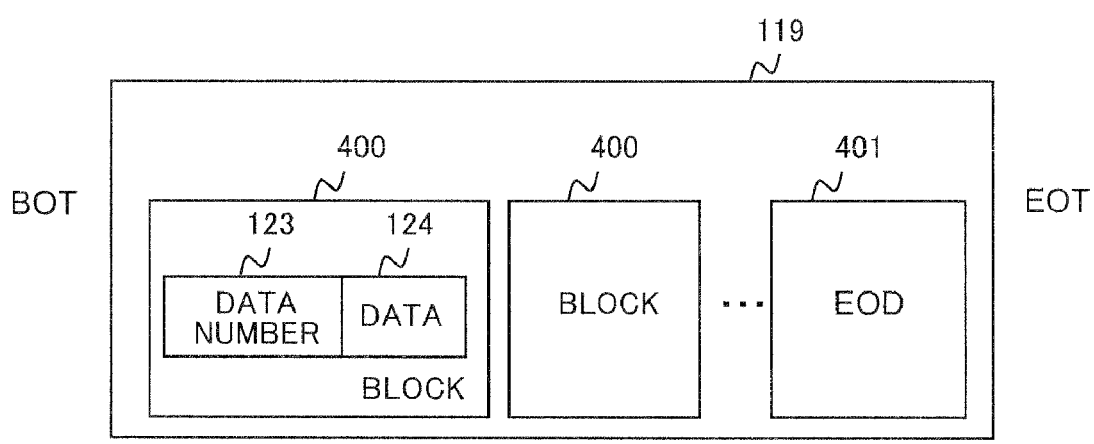
FIG. 4 is a diagram showing a recording format of a magnetic tape.

FIG. 4 shows the recording format of the magnetic tape 119. A plurality of blocks 400 and one EOD 401 (EOD: End Of Data (shows that it is the end of the block) are recorded on the magnetic tape 119. The block 400 comprises one data number 123 and one data 124. Moreover, the block 400 includes a block number that is differentiated from the other blocks. The block number is incremented one at a time such as 1, 2, 3 . . . from the beginning of the tape (BOT side) to the end of the tape (EOT side) of the magnetic tape 119.

If the magnetic tape device stores the data and data number on the magnetic tape immediately after mounting the magnetic tape 119 onto the magnetic tape device 118, the block of block number 1 will be recorded on the magnetic tape. Subsequently, the data and data number are recorded in the block of block number 2, and the blocks 400 are sequentially recorded toward the EOT side.

Moreover, if the magnetic tape device reproduces the blocks 400 after rewinding the magnetic tape 119, the block 400 of block number 1 is reproduced, and subsequently the block 400 of block number 2 is reproduced; that is, the blocks 400 are sequentially reproduced toward the EOT side. The reproduction of the blocks 400 is continued until the block 400 that was recorded last.

For example, if the magnetic tape device 118 is mounted onto the magnetic tape 119 and three blocks 400 are recorded, the block 400 of block number 1 and the block 400 of block number 2 and the block 400 of block number 3 are recorded on the magnetic tape 119. If the magnetic tape device 118 rewinds the magnetic tape 119 and thereafter reproduces the magnetic tape, the three blocks 400 are reproduced; namely, the block 400 of block number 1 and the block 400 of block number 2 and the block 400 of block number 3.

EOD 401 is information that is recorded after the last block 400 of the magnetic tape 119, and shows the end of the block 400. In order for the control processor 110 to mount the magnetic tape 119 recording up to the blocks 400 of block number 3 onto the magnetic tape device 118 and then record the block 400 of block number 4, the control processor 110 requests the magnetic tape device 118 to fast forward to the EOD 401, and subsequently issues a recording request of that block 400. After the recording request of the block 400, the EOD 401 is automatically recorded on the magnetic tape 119 by the magnetic tape device 118, even without any request from the control processor 110, prior to performing the operation of rewinding the magnetic tape 119.

FIG. 5 shows the data structure of the old full data management information 500. The old full data management information 500 is information for managing which magnetic tape 119 recorded all data 124 (hereinafter referred to as the "old full data") and the data number 123 for identifying such data 124, which were recorded in the magnetic disk device 102 at a certain point in time, and comprises a magnetic disk device number 501 and a magnetic tape number 502. The magnetic disk device number 501 is a number for identifying the respective magnetic disk devices 102, and the magnetic tape number 502 is a number for identifying the respective magnetic tapes 119.

The management information shown in FIG. 5 shows an example where the old full data composed of all data and the corresponding data number, which is recorded in a magnetic disk device that is identified with the number "100," are recorded in a magnetic tape that is identified with the number "11."

Although the old full data management information 500 shows that one magnetic disk device 102 and one magnetic tape 119 are in correspondence, if data and a data number identifying such data at a certain point in time, which are recorded in a magnetic disk device, are to be recorded in a plurality of magnetic tapes, one magnetic disk device number 501 and a plurality of magnetic tape numbers 502 will be correspondence. The magnetic tape number 502 may take "NULL" as a special number that does not correspond to any magnetic tape 119. The foregoing case (NULL) shows that the data of the corresponding magnetic disk device has not been backed up to the magnetic tape.

FIG. 6 shows the data structure of the differential data management information 600. The differential data management information 600 is information for managing which magnetic tape 119 recorded the differential data of the magnetic disk device 102, and information for managing which magnetic tape device 118 was used to record the differential information on the magnetic tape 119. The management information comprises a magnetic disk device number 601, a magnetic tape number 602, a magnetic tape device number 603, and a block count 604. The block count 604 is to total number of blocks 400 that are recorded on the magnetic tape 119.

The differential data management information 600 shown in FIG. 6 shows an example where the differential data of the magnetic disk device 102 that is identified with the number "100" is recorded on the magnetic tape 119 that is identified with the number "31," and also shows that the differential data of the magnetic disk device 102 that is identified with the number "100" is recorded on the magnetic tape 119 using the magnetic tape device 118 that is identified with the number "200."

Incidentally, the differential data of a plurality of magnetic disk devices may also be recorded on a single magnetic tape. Moreover, the magnetic tape number may take "NULL" (undefined status) as a special number that does not correspond to any magnetic tape. In addition, the magnetic tape device number 603 may take "NULL" (undefined status) as a special number that does not correspond to any magnetic tape device.

FIG. 7 shows the data structure of the new full data management information 700. The new full data management information is information for managing on which magnetic tape 119 the new full data, which is composed by synthesizing all data 124 and the corresponding data number 123 with differential data recorded in the magnetic disk device 102 at a certain point in time, was recorded. The new full data management information 700 comprises a disk device number 701 and a magnetic tape number 702. FIG. 7 shows that the new full data of the data 124 and its data number 123, which were recorded in the magnetic disk device 102 that is identified by the number "100," are recorded on the magnetic tape 119 that is identified with the number "11."

Although the new full data management information 700 shows that one magnetic disk device 102 and one magnetic tape 119 are in correspondence, one magnetic disk device 102 and a plurality of magnetic tape numbers 702 may also be in correspondence. In addition, the magnetic tape number 702 may take "NULL" (undefined status) as a special number that does not correspond to any magnetic tape 119.

FIG. 8 shows the data structure of the differential data during synthesis processing management information 800. The differential data during synthesis processing management information 800 includes information for managing which magnetic tape 119 recorded the differential data that was transferred from the primary subsystem 101 based on a write command from the host system 100 while the control processor 110 is executing the synthesis processing 213, and information for managing which magnetic tape device 118 was used to record the differential data on the magnetic tape 119.

This management information is configured from a magnetic disk device number 801, a magnetic tape number 802, a magnetic tape device number 803, and a block count 804. The magnetic disk device number 801 is a number for the plurality of magnetic disk devices 102 to identify each other. The magnetic tape number 802 is a number for the plurality of magnetic tapes 119 to identify each other. The magnetic tape device number 803 is a number for the plurality of magnetic tape devices 118 to identify each other. The block count 804 is the total number of blocks 400 that are recorded on the magnetic tape 119.

The differential data during synthesis processing management information 800 shows that the differential data of the magnetic disk device 102 that is identified with the number "100" is recorded on the magnetic tape 119 that is identified with the number "41," and additionally shows that the differential data of the magnetic disk device 102 that is identified with the number "100" was recorded on the magnetic tape 119 using the magnetic tape device 118 that is identified with the number "300." Incidentally, the differential data of a plurality of magnetic disk devices may also be recorded on a single magnetic tape.

FIG. 9 shows the data structure of the magnetic tape management information 900. The magnetic tape management information 900 is information shows whether the magnetic tape 119 is being used for at least one type of processing among the full data recording processing 211, the differential data recording processing 212, the synthesis processing 213, and the full data transfer processing 214, and comprises a magnetic tape number 901 and a usage status 902.

The magnetic tape number 901 is a number for identifying the respective magnetic tapes 119. The usage status 902 is information showing whether the magnetic tape 119 is being used, and "in use" shows that it is being used and "not in use" shows that it is not being used. The magnetic tape management information 900 shown in FIG. 9 shows that the magnetic tape 119 identified with the number "1" is being used.

FIG. 10 shows the data structure of the magnetic tape device management information 1000. The magnetic tape device management information 1000 is information showing whether the magnetic tape device 118 is being used in the full data recording processing 211, the differential data recording processing 212, the synthesis processing 213, and the full data transfer processing 214, and is configured from a magnetic tape device number 1001 and a usage status 1002.

The magnetic tape device number 1001 is a number for identifying the respective magnetic tape devices 118. The usage status 1002 is information showing whether the magnetic tape device 118 is being used, and "in use" shows that the magnetic tape device 118 is being used and "not in use" shows that the magnetic tape device 118 is not being used. The magnetic tape device management information 1000 shown in FIG. 10 shows that the magnetic tape device 118 identified with the number "1" is being used.

FIG. 11 shows the data structure of the operational status management information 1100. The operational status management information 1100 is information showing whether the secondary subsystem 121 is performing the synthesis processing 213, and comprises a magnetic disk device number 1101 and an operational status 1102.

The operational status 1102 is information showing whether the synthesis processing 213 is being performed, and "synthesis processing" shows that the synthesis processing 213 is being performed, and "normal processing" shows that normal processing is being performed without performing the synthesis processing 213.

Since the example of FIG. 6 shows that the differential data of one magnetic disk device 102 is recorded on one magnetic tape 119, the synthesis processing 213 is performed to the full data of one magnetic disk device 102 and the differential data of one magnetic tape.

Accordingly, the operational status management information 1100 shown in FIG. 11 shows that the synthesis processing 213 is being performed to the full data of the magnetic disk device 102 that is identified with the number "100" and the differential data of the magnetic tape that is identified with the number "31."

When recording the differential data of a plurality of magnetic disk devices 102 on one magnetic tape 119, the number of a plurality of magnetic disk devices 102 and the one operational status 1102 will correspond.

FIG. 12 shows the data structure of the per-block differential management information 1200. The per-block differential management information 1200 shows the status of differential data from the point in time that the old full data was created up to the point in time that the synthesis processing is to be newly executed regarding each block, and is configured from a block number 1201 and a differential status 1202.

The block number 1201 is a number for identifying the respective blocks. The differential status 1202 records whether differential has occurred from the point in time that the full that was created in the corresponding block. The differential status 1202 records "1" showing "with differential," "0" showing "without differential," or "NULL" showing "undefined." Incidentally, the differential status 1202 of the per-block differential management information 1200 is updated at step 2003 of the synthesis processing 213 shown in FIG. 20.

FIG. 13 is now explained. Foremost explained are the "processing unit block group" and the "transfer block group" that are used in the synthesis processing 213 of FIG. 20 and in the sub routine of the synthesis processing 213 of FIG. 21 explained later.

The "processing unit block group" is a part of the data on the magnetic tape, and shows a sequential plurality of blocks. Moreover, the "transfer block group" is a consecutive block group that is obtained by dividing the processing unit block group into a prescribed size. The size of the transfer block group is the "transfer block size."

The synthesis processing 213 performs data transfer for each transfer block group to a certain processing unit block group. For example, if the size of the processing unit block group is 1024 blocks, and the transfer block size is 4 blocks, the processing unit block group will be transferred upon being divided into 256 transfer block groups. Incidentally, in the synthesis processing 213 and the like, the transfer block size may differ for each processing unit block group. Moreover, the size of the processing unit block group may be a fixed size (for instance, 1024 blocks) in the control apparatus.

FIG. 13 shows the data structure of the transfer block group management information 1300. The transfer block group management information 1300 is a data structure storing information concerning the transfer block group, and includes a transfer block size 1301, a transfer block group number 1302, a corresponding block 1303, a differential status 1304, and a transfer block group count with differential 1305 and a transfer block group count without differential 1306.

Whether there is or there is no differential is determined by the control processor 110 checking the differential status 1304. Moreover, the decision of the differential status 1304 itself is conducted by the control processor 110 according to the processing shown in FIG. 23.

The various types of information in the transfer block group management information 1300 are used for calculating the transfer cost described later in the transfer block size decision processing 216 also described later. The transfer block size 1301 has a value such as 4 blocks, 8 blocks, 16 blocks, or 32 blocks in the list defined within the control apparatus 112.

For each transfer block size, a transfer block group number 1302 of 0, 1, 2, . . . is assigned from the top to the transfer block group, and the individual transfer block groups can thereby be uniquely identified in the processing unit block group.

The corresponding block 1303 records information showing the scope of blocks corresponding to the individual transfer block groups. For example, the four blocks of block "0" to block "3" are associated with the transfer block group number "0" having a transfer block size of "4 blocks." Incidentally, if the value is undefined, the undefined value of "NULL" is set.

The differential status 1304 records whether differential data has occurred to the corresponding transfer block group from the point in time that the full data was acquired up to the point in time that the synthesis processing was executed. The differential status 1304 records "1" showing "with differential," "0" showing "without differential," and "NULL" showing "undefined." The transfer block group count with differential 1305 counts and sets the number of transfer block groups with differential (transfer block groups in which the differential status 1304 is 1) among the transfer block groups in relation to a certain transfer block size. If the value is undefined, the undefined value of "NULL" is set. The transfer block group count without differential 1306 counts and sets the number of transfer block groups without differential (transfer block groups in which the differential status 1304 is 0) among the transfer block groups in relation to a certain transfer block size. If the value is undefined, the undefined value of "NULL" is set.

FIG. 14 is now explained. In order to facilitate the understanding of FIG. 14, the data transfer in the synthesis processing 213 is foremost explained. Data stored in the magnetic tape of the synthesis source recording the old full data to be subject to the synthesis processing is synthesized with differential data via either a first transfer path or a second transfer path to create new full data, and transferred to the magnetic tape of the synthesis destination to record the synthesized new full data.

The first transfer path is a path that passes through the magnetic tape device 118 storing the magnetic tape of the synthesis source, the buffer 109a, the cache memory 122, the buffer 109a, and subsequently leads to the magnetic tape device 118 storing the magnetic tape of the synthesis destination.

The control processor 110 once reads and stores the data recorded in the magnetic tape device into the buffer 109a. Subsequently, the cache memory 122 temporarily stores this data from the buffer 109a.

The reason why the first transfer path passes through the cache memory 122 is to cause the control processor 110 to perform the data update processing by applying the differential data to the data of the cache memory 122. The updated data is transferred to the magnetic tape of the synthesis destination via the buffer 109a. The buffer 109a is used simply for performing high-speed data transfer, and is not used for updating the data.

Meanwhile, the second transfer path is a path that passes through the magnetic tape device 118 storing the magnetic tape of the synthesis source, the buffer 109a, and leads to the magnetic tape device 118 storing the magnetic tape of the synthesis destination. Unlike the first transfer path, since the second transfer path does not comprise the cache memory 122, the differential data is not applied to the old full data. In addition, the old full data only passes through the buffer 109a once. Thus, the data transfer along the second transfer path (transfer for old data which is not synthesized with differential data) will progress faster than the data transfer along the first transfer path.

FIG. 14 shows the data structure of the transfer cost coefficient management information 1400. The transfer cost coefficient management information 1400 stores the coefficient to be used in the calculation of the transfer cost in the transfer block size decision processing 216 described later, and is configured from a transfer block size 1401, a first transfer cost coefficient 1402, and a second transfer cost coefficient 1403.

The first transfer cost coefficient 1402 shows the coefficient in the case of transferring a block via the first transfer path. The second transfer cost coefficient 1403 shows the coefficient in the case of transferring a block via the second transfer path.

The first transfer cost coefficient is a value that is normalized by dividing the reference value, which is the data transfer time upon transferring data of a transfer block group of a transfer block size via the first transfer path.

The first transfer cost coefficient may be a static value based on a pre-measured data transfer time, or a dynamic value that is updated based on the measured data transfer time. The same applies to the second transfer cost coefficient. Incidentally, the calculation method of the transfer cost using the foregoing coefficients will be explained later.

FIG. 15 shows the data structure of the transfer cost management information 1500. The transfer cost management information 1500 is information showing the transfer cost upon transferring a block in a certain processing unit block group with a certain transfer block size, and is configured from a transfer block size 1501 and a transfer cost 1502. Here, the transfer cost is an index that correlates with the transfer time, and implies that lower the cost, the faster the completion of the transfer. If the value of the transfer cost 1502 is undefined, the undefined value of "NULL" is set.

Figure 16:
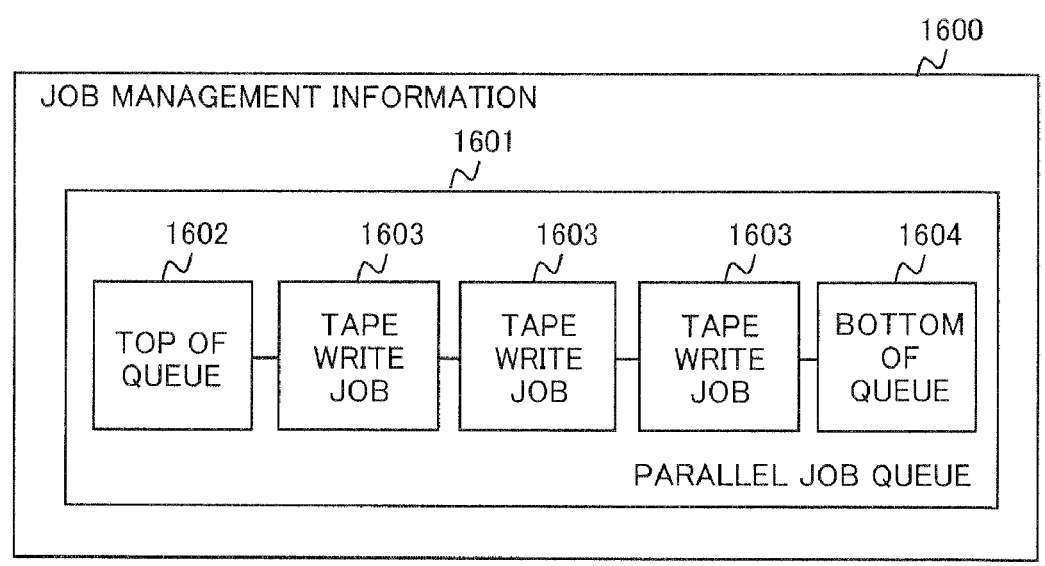
FIG. 16 is a diagram showing the data structure of job management information.

Prior to explaining FIG. 16, the parallel processing method where the control processor 110 performs in parallel the reading of data from the magnetic tape of the synthesis source and the writing of data onto the magnetic tape of the synthesis destination is foremost explained. The synthesis of data is performed based on the synthesis processing 213 and the parallel job execution processing 215. The synthesis processing 213 registers a job in a parallel job queue (FIFO queue) for reading data from the magnetic tape of the synthesis source, and writing data obtained by synthesizing the read data with the update data, or data having a value during the reading to which the update data is not applied onto the magnetic tape of the synthesis destination.

The parallel job execution processing 215 retrieves a tape write job from the parallel job queue, and executes the processing of writing data onto the magnetic tape of the synthesis destination. Since the synthesis processing 213 and the parallel job execution processing 215 operate independently, the reading of data from the magnetic tape of the synthesis source and the writing of data onto the magnetic tape of the synthesis destination are performed in parallel.

FIG. 16 shows the data structure of the job management information 1600. The job management information 1600 retains the parallel job queue 1601 for managing the tape write job. The parallel job queue 1601 comprises a data structure for realizing the FIFO (First-In First Out) queue that is well-known as a doubly-linked list (one type of linked list in which each node has two links; namely, a front link and a back link).

Incidentally, the reason why the job management information uses FIFO is to ensure the order of writing data into the tape as a sequential media. The parallel job queue 1601 has a queue top 1602 and a queue bottom 1604, and a tape write job 1603 of 0 or more is connected therebetween.

If a queue is to be registered in the tape write job 1603, that tape write job 1603 is connected to the queue bottom. This is referred to as "enqueue." If the control processor 110 is to execute the tape write job 1603 as the parallel job execution processing 215, it retrieves one tape write job 1603 that is connected to the queue top. This is referred to as "dequeue." Subsequently, the tape write job 1603 is executed. Since the order of the plurality of tape write jobs 1603 is managed with the FIFO queue, the writing order onto the tape is ensured.

Figure 17:
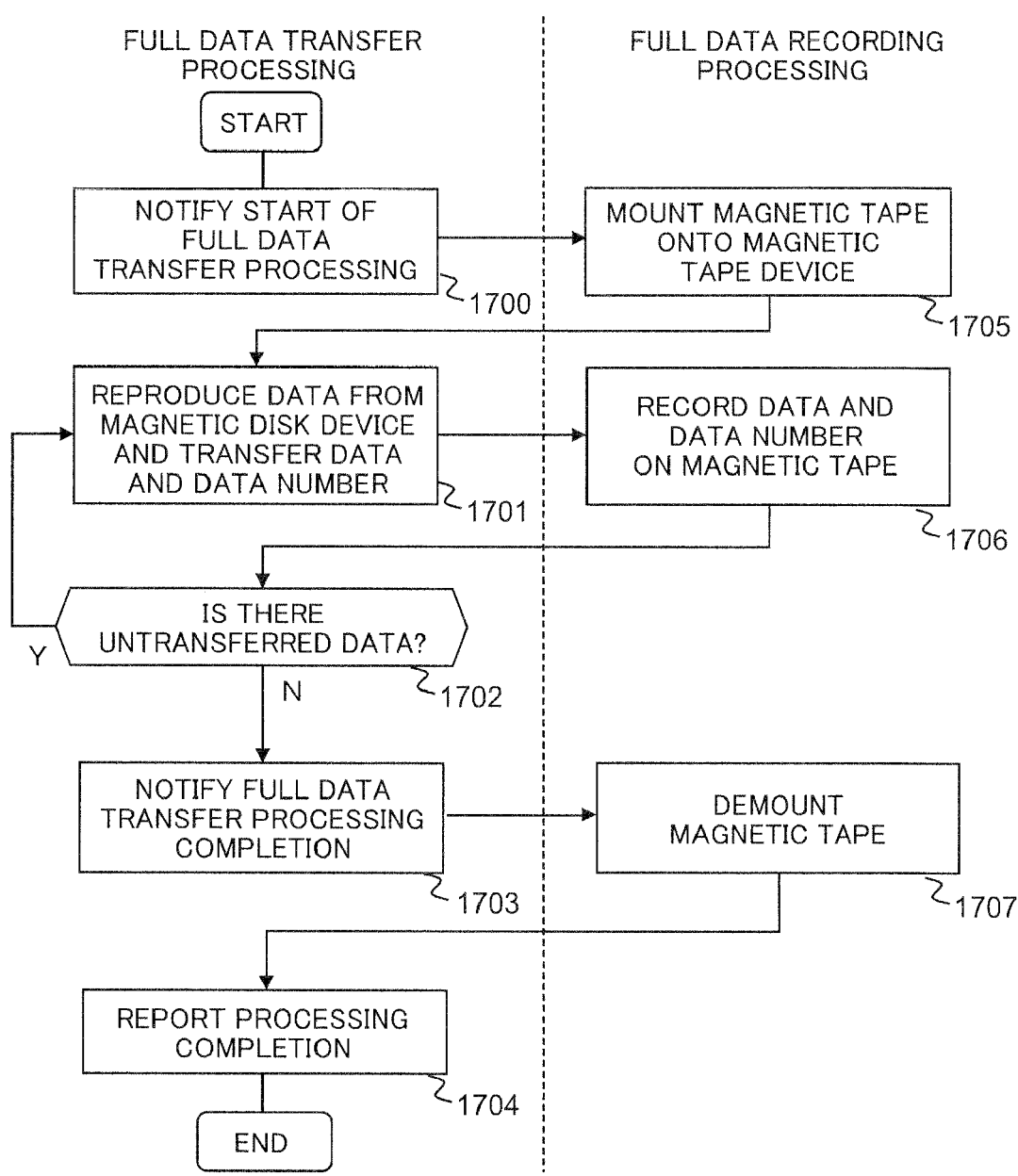
FIG. 17 is a diagram showing the processing flow of full data transfer processing and full data recording processing.

FIG. 17 shows the processing flow of the full data transfer processing 202 and the full data recording processing 211. As a result of the foregoing processing, the data 124 and the data number 123 for identifying such data 124, which are recorded in the magnetic disk device 102, are recorded on the magnetic tape 119.

The control processor 106 starts the full data transfer processing 202 according to a request from the host system 100. Here, the host system 100 designates which magnetic disk device 102 is the target. At step 1700, the control processor 106 notifies the start of the full data transfer processing to the control processor 110. Here, the number identifying the magnetic disk device 102 that was designated by the host system 100 is notified.

When the control processor 110 receives the full data transfer processing start notification from the control processor 106, it starts the full data recording processing 211. At step 1705, foremost, the control processor 110 refers to the magnetic tape management information 900, selects one magnetic tape number 901 in which the usage status 902 is "not in use," and sets the usage status 902 corresponding to the selected magnetic tape number 901 to "in use."

Subsequently, the control processor 110 checks the magnetic tape device management information 1000, selects one magnetic tape device number 1001 in which the usage status 1002 is "not in use," and sets the usage status 1002 corresponding to the selected magnetic tape device number 1001 to "in use."

Subsequently, the control processor 110 requests the library device 120 to mount the magnetic tape 119 that is identified with the selected magnetic tape number 901 onto the magnetic tape device 118 that is identified with the selected magnetic tape device number 1001, and thereby mounts the magnetic tape 119 onto the magnetic tape device 118.

Subsequently, the control processor 110 searches for the magnetic disk device number that was notified from the control processor 106 from the old full data management information 500, and sets the selected magnetic tape number 901 in the corresponding magnetic tape number 502. The control processor 110 thereby ends the initial processing of the full data recording processing 211, and notifies this to the control processor 106.

When the control processor 106 receives the initial processing completion report from the control processor 110, it executes step 1701. At step 1701, the control processor 106 reproduces the data 124 from the magnetic disk device 102 that is designated by the host system 100, and transfers the reproduced data 124 and the data number 123 for identifying such data 124 to the control apparatus 112.

At step 1706, the control processor 110 foremost receives the data number 123 and the data 124 and stores them in the cache memory 122. Subsequently, the control processor 110 issues a recording request to the magnetic tape device 118 that is identified with the magnetic tape device number 1001 selected at step 1705, and records the block 400 that is configured from the data number 123 and the data 124 stored in the cache memory 122 onto the magnetic tape 119 that is identified with the magnetic tape number 901 selected at step 1705. Once the received data number 123 and the data 124 are recorded onto the magnetic tape 119, the control processor 110 sends a recording completion report to the control processor 106.

When the control processor 106 receives the recording completion report from the control processor 110, it executes step 1702. At step 1702, the control processor 106 determines whether all data 123 in the magnetic disk device 102 that was designated by the host system 100 have been transferred to the control apparatus 112, and proceeds to step 1703 if all data have been transferred, and returns to step 1701 if all data have not been transferred. At step 1703, the control processor 106 notifies the completion of the full data transfer processing to the control processor 110.

When the control processor 110 receives the full data transfer processing completion report from the control processor 106, it executes step 1707. At step 1707, the control processor 106 issues a demount request to the library device 120, and demounts the magnetic tape 119 that is identified with the magnetic tape number 901 selected at step 1705 from the magnetic tape device 118 that is identified with the magnetic tape device number 1001 selected at step 1705. Subsequently, the control processor 110 sends a processing completion report to the control processor 106, and thereby ends the full data recording processing 211.

When the control processor 110 receives the processing completion report, the control processor 106 sends a completion report to the host system 100 at step 1704, and thereby ends the full data transfer processing 202.

Figure 18:
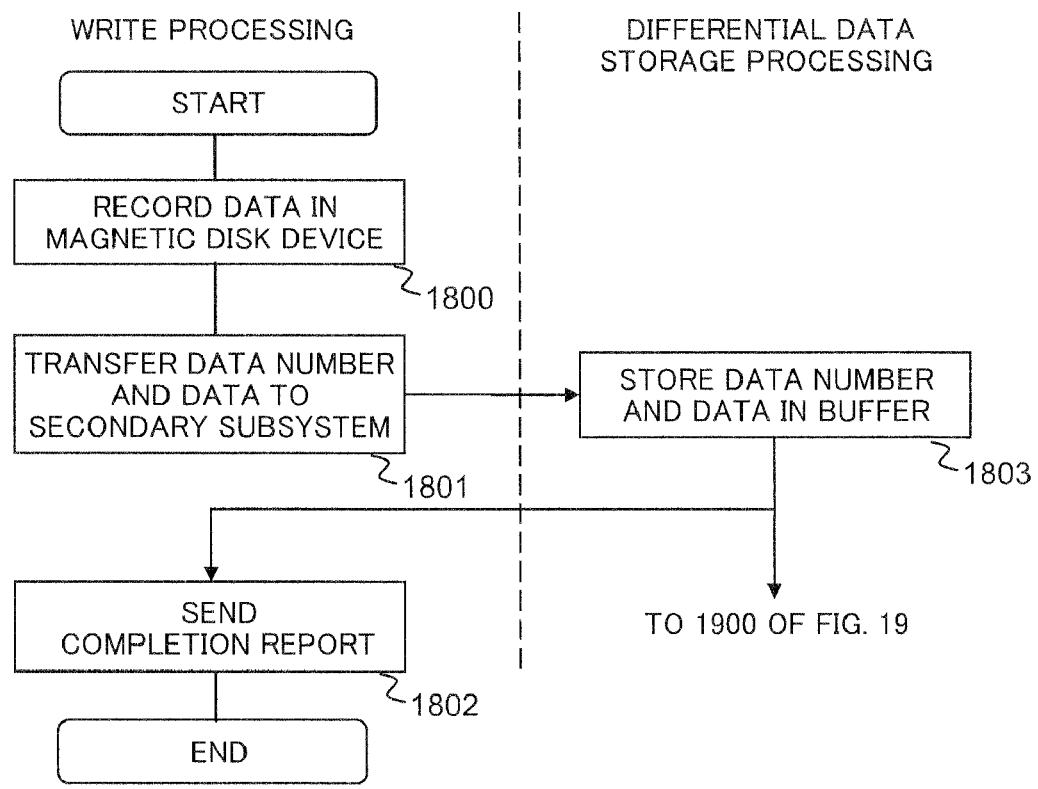
FIG. 18 is a diagram showing the processing flow of write processing and differential data recording processing.
Figure 19:
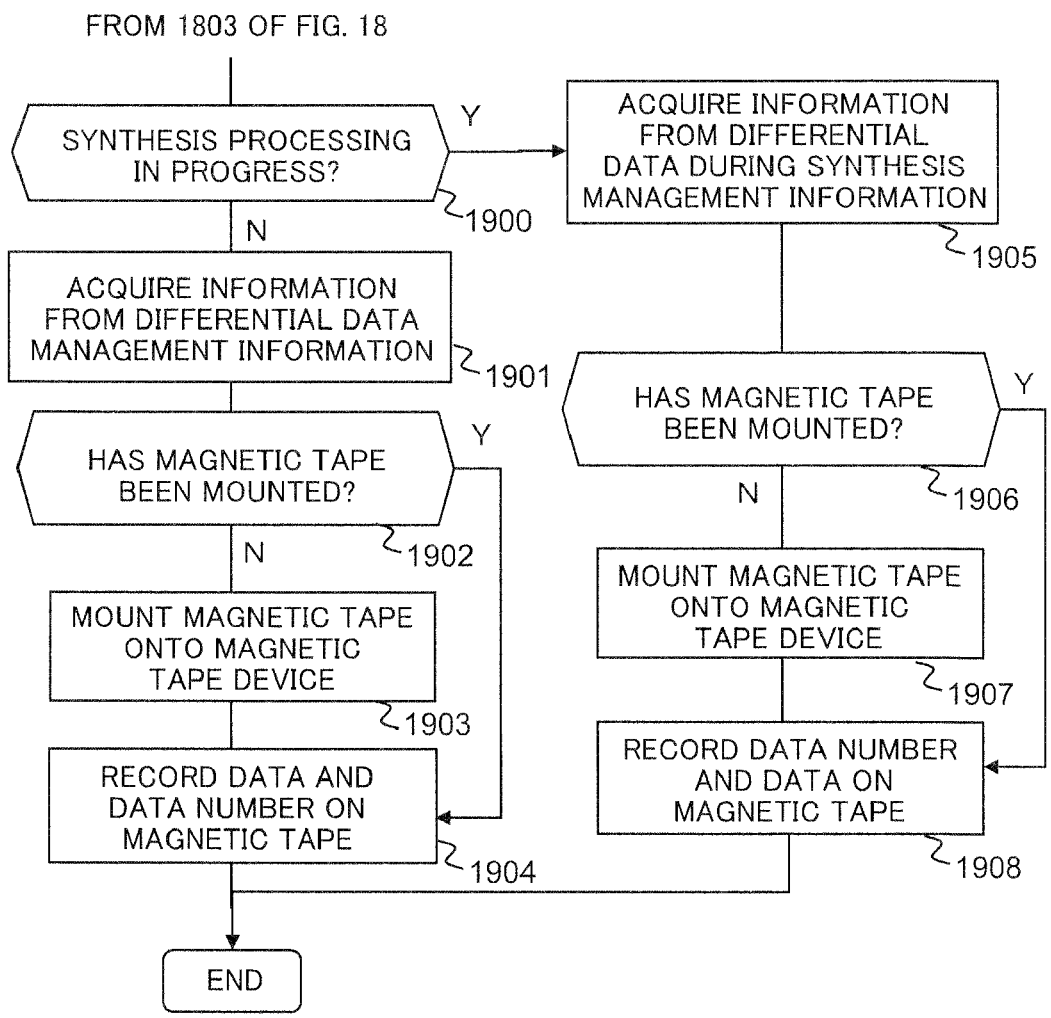
FIG. 19 is a diagram showing the processing flow of differential data recording processing subsequent to FIG. 18.

FIG. 18 and FIG. 19 show the processing flow of the write processing 201 and the processing flow of the differential data recording processing 212. When the control apparatus 108 receives a write request 122 from the host system 100, the control processor 106 starts the write processing 201.

At step 1800, the control processor 106 foremost stores the data number 123 and the data 124 received from the host system 100 are stored in the buffer 107. Subsequently, the control processor 106 records the data 124 in the magnetic disk device 102 according to the data number 123.

At step 1801, the control processor 106 transfers the data number 123 and the data 124 stored in the buffer 107 to the secondary subsystem 112. Upon receiving the data number 123 and the data 124 transferred from the primary subsystem 101, the control processor 110 starts the differential data recording processing 212. At step 1803, the control processor 110 stores the received data number 123 and the data 124 in the cache memory 122, and sends a completion report to the control processor 106. Upon receiving this completion report, the control processor 106 sends a completion report to the host system 100 and thereby ends the write processing 201.

At step 1900, the control processor 110 foremost determines which magnetic disk device 102 is recording the data 124 stored in the cache memory 122 from the data number 123 stored in the cache memory 122, and calculates the number for identifying that magnetic disk device 102.

Subsequently, the control processor 110 checks the operational status management information 1100, and acquires the operational status 1102 corresponding to the magnetic disk device number 1101 that is equivalent to the number that identifies the calculated magnetic disk device 102. The control processor 110 proceeds to step 1905 if the acquired operational status 1102 is "synthesis processing," and proceeds to step 1901 if the acquired operational status 1102 is "normal processing."

At step 1901, the control processor 110 checks the differential data management information 600, and acquires the magnetic tape number 602, the magnetic tape device number 603 and the block count 604 corresponding to the magnetic disk device number 601 that is equivalent to the number that identifies the magnetic disk device 102 calculated at step 1900.

At step 1902, the control processor 110 checks whether the magnetic tape number 602 acquired at step 1901 is "NULL," and thereby determines whether a magnetic tape has been mounted. The control processor 110 proceeds to step 1903 if it is "NULL," and proceeds to step 1904 if it is not "NULL."

At step 1903, the control processor 110 foremost checks the magnetic tape management information 900, selects one magnetic tape number 901 in which the usage status 902 is "not in use," and sets the usage status 902 corresponding to the selected magnetic tape number 901 to "in use."

Subsequently, the control processor 110 checks the magnetic tape device management information 1000, selects one magnetic tape device number 1001 in which the usage status 1002 is "not in use," and sets the usage status 1002 corresponding to the selected magnetic tape device number 1001 to "in use."

Subsequently, the control processor 110 requests the library device 120 to amount the magnetic tape 119 that is identified with the selected magnetic tape number 901 onto the magnetic tape device 118 that is identified with the selected magnetic tape device number 1001, and the library device 120 thereby mounts the magnetic tape 119 onto the magnetic tape device 118.

Subsequently, the control processor 110 refers to the differential data management information 600 and sets the selected magnetic tape number 901 to the magnetic tape number 602 corresponding to the number of the magnetic disk device calculated at step 1900, similarly sets the selected magnetic tape device number 1001 to the magnetic tape device number 603, and sets 0 to the block count 604.

At step 1904, the control processor 110 issues a recording request to the magnetic tape device 118 corresponding to the magnetic tape device number 603 acquired at step 1901, and records the block 400 configured from the data number 123 and the data 124 stored in the cache memory 122 onto the magnetic tape 119. Otherwise, the control processor 110 issues a recording request to the magnetic tape device 118 corresponding to the magnetic tape device number 1001 selected at step 1903, and records the block 400 configured from the data number 123 and the data 124 stored in the cache memory 122 onto the magnetic tape 119.

Subsequently, the control processor 110 increments by one the block count 604 corresponding to the magnetic disk device number 601 of the differential data management information 600 that is equivalent to the number of the magnetic disk device 102 calculated at step 1900, and thereby ends the differential data recording processing 212.

At step 1905, the control processor 110 checks the differential data during synthesis processing management information 800, and acquires the magnetic tape number 802, the magnetic tape device number 803, and the block count 804 corresponding to the magnetic disk device number 801 that is equivalent to the number that identifies the magnetic disk device 102 calculated at step 1900. At step 1906, the control processor 110 checks whether the magnetic tape number 802 acquired at step 1905 is "NULL," proceeds to step 1907 if it is "NULL," and proceeds to step 1908 if it is not "NULL."

At step 1907, the control processor 110 foremost checks the magnetic tape management information 900, selects one magnetic tape number 901 in which the usage status 902 is "not in use," and sets the usage status 902 corresponding to the selected magnetic tape number 901 to "in use."

Subsequently, the control processor 110 checks the magnetic tape device management information 1000, selects one magnetic tape device number 1001 in which the usage status 1002 is "not in use," and sets the usage status 1002 corresponding to the selected magnetic tape device number 1001 to "in use."

Subsequently, the control processor 110 requests the library device 120 to mount the magnetic tape 119 that is identified with the selected magnetic tape number 901 onto the magnetic tape device 118 that is identified with the selected magnetic tape device number 1001, and thereby mounts the magnetic tape 119 onto the magnetic tape device 118.

Subsequently, the control processor 110 refers to the differential data during synthesis processing management information 800, sets the selected magnetic tape number 901, sets the selected magnetic tape device number 1001, and additionally sets 0 to the corresponding block count 804 in correspondence with the number of the magnetic disk device 102 calculated at step 1900.

At step 1908, the control processor 110 issues a recording request to the magnetic tape device 118 corresponding to the magnetic tape device number 803 acquired at step 1905, and records the block 400 configured from the data number 123 and the data 124 stored in the cache memory 122 onto the magnetic tape 119. Otherwise, the control processor 110 issues a recording request to the magnetic tape device 118 corresponding to the magnetic tape device number 1001 selected at step 1907, and records the block 400 configured from the data number 123 and the data 124 stored in the cache memory 122 onto the magnetic tape 119.

Subsequently, the control processor 110 increments by one the block count 804 corresponding to the magnetic disk device number 801 of the differential data during synthesis processing management information 800 that is equivalent to the number of the magnetic disk device 102 calculated at step 1900, and thereby ends the differential data recording processing 212.

Figure 20:
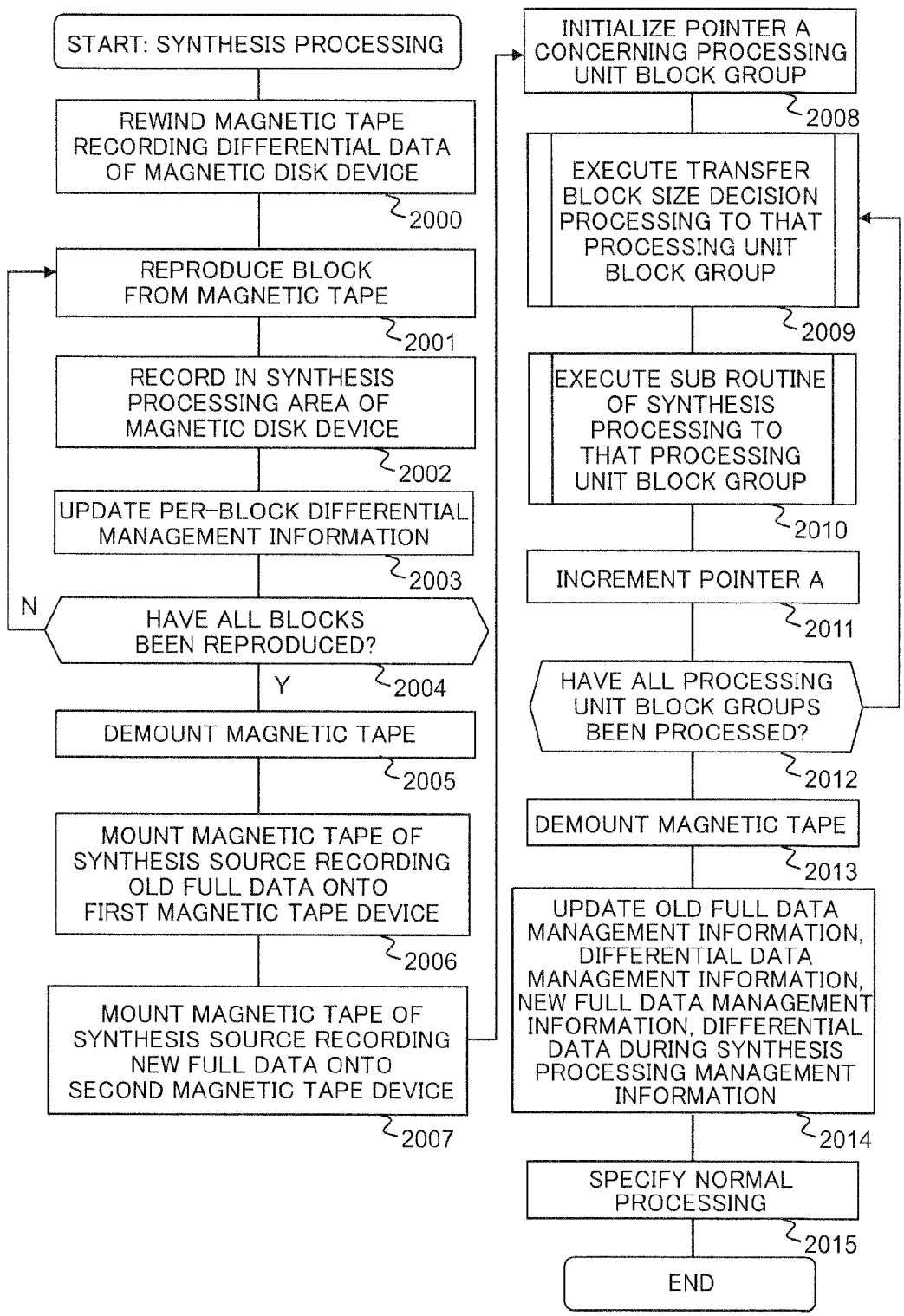
FIG. 20 is a diagram showing the processing flow of synthesis processing.

FIG. 20 shows the processing flow of the synthesis processing 213. The control processor 110 refers to the block count 604 of the differential data management information 600, which could be used as the trigger of starting the synthesis processing, and, if that value exceeds a predetermined value, it starts the synthesis processing 213 in order to create new full data from the old full data and differential data of the magnetic disk device 102 that is identified with the corresponding magnetic disk device number 601. Incidentally, the control processor 110 may also start the synthesis processing 213 in predetermined time intervals.

A case is explained of executing the synthesis processing 213 to the full data of the magnetic disk device 102 and the differential data in this magnetic disk device that is identified with the number "100" by referring to FIG. 20. Incidentally, needless to say, when executing the synthesis processing 213 to another magnetic disk device, "100" is substituted with another number.

At step 2000, the control processor 110 checks the differential data management information 600, and acquires the magnetic tape device number "200" corresponding to the magnetic disk device number 601 that is equivalent to the number "100." Subsequently, the control processor 110 requests the magnetic tape device 118 corresponding to the acquired magnetic tape device number "200" to rewind the magnetic tape 119, and rewinds the mounted magnetic tape 119 to the beginning.

At step 2001, the control processor 110 sends a reproduction request to the magnetic tape device 118 corresponding to the magnetic tape device number selected at step 2000, and reproduces the block 400 recorded on the magnetic tape 119 and records it in the cache memory 122.

At step 2002, the control processor 110 sends a recording request to the magnetic disk device 117, and the magnetic disk device 117 stores the data 124, which configures the block 400 stored in the cache memory 122, in the block 301 within the synthesis processing area 300. Here, the control processor 110 records the data 124 in the block 301 corresponding to the data number 123.

At step 2003, the control processor 110 updates and sets "1" showing "with differential" in the differential status 1202 of the entry having the block number 1201 corresponding to the block 301 regarding the per-block differential management information 1200.

At step 2004, the control processor 110 determines whether all blocks 400 recorded in the magnetic tape 119 have been reproduced, and determines whether the data 124 of all reproduced blocks 400 have been recorded in the synthesis processing area 300 of the magnetic disk device 117, and proceeds to step 2005 upon obtaining a positive result, and returns to step 2001 if there are remaining blocks.

At step 2005, the control processor 110 sends a demount request to the library device 120, and demounts the magnetic tape device 118 corresponding to the magnetic tape device number 1001 selected at step 2000 from the magnetic tape 119.

At step 2006, the control processor 110 checks the magnetic tape device management information 1000, selects one magnetic tape device number 1001 in which the usage status 1002 is "not in use," and sets the usage status 1002 corresponding to the selected magnetic tape device number 1001 to "in use."

Subsequently, the control processor 110 checks the old full data management information 500, acquires the magnetic tape number 502 corresponding to the magnetic disk device number 1001 equivalent to the number "100," and specifies the magnetic tape 119 that is recording the old full data of the magnetic disk device 102 that is identified with the number "100."

Subsequently, the control processor 110 sends a mount request to the library device 120, and mounts the specified magnetic tape 119 onto the magnetic tape device 118 corresponding to the selected magnetic tape device number 1001. The mounted magnetic tape 119 is recording the old full data, and this magnetic tape 119 becomes the magnetic tape of the synthesis source in the synthesis processing.

At step 2007, the control processor 110 checks the magnetic tape device management information 1000, selects one magnetic tape device number 1001 in which the usage status 1002 is "not in use," and sets the usage status 1002 corresponding to the selected magnetic tape device number 1001 to "in use."

Subsequently, the control processor 110 updates and sets "11" as the selected magnetic tape number 1001 in the magnetic tape number 702 corresponding to the magnetic disk device of the number "100" in the new full data management information 700.

Subsequently, the control processor 110 checks the magnetic tape device management information 1000, selects one magnetic tape device number 1001 in which the usage status 1002 is "not in use," and sets the usage status 1002 corresponding to the selected magnetic tape device number 1001 to "in use."

Subsequently, when the control processor 110 sends a mount request to the library device 120, the library device 120 mounts the magnetic tape 119 corresponding to the selected magnetic tape number 1001 onto the magnetic tape device 118 corresponding to the selected magnetic tape device number 1001. Since the mounted magnetic tape 119 is recording the new full data in the processing described later, this magnetic tape 119 becomes the magnetic tape of the synthesis destination in the synthesis processing.

At step 2008, the pointer A concerning the processing unit block group is initialized with 0 representing the first processing unit block group in the magnetic tape.

Figure 23:
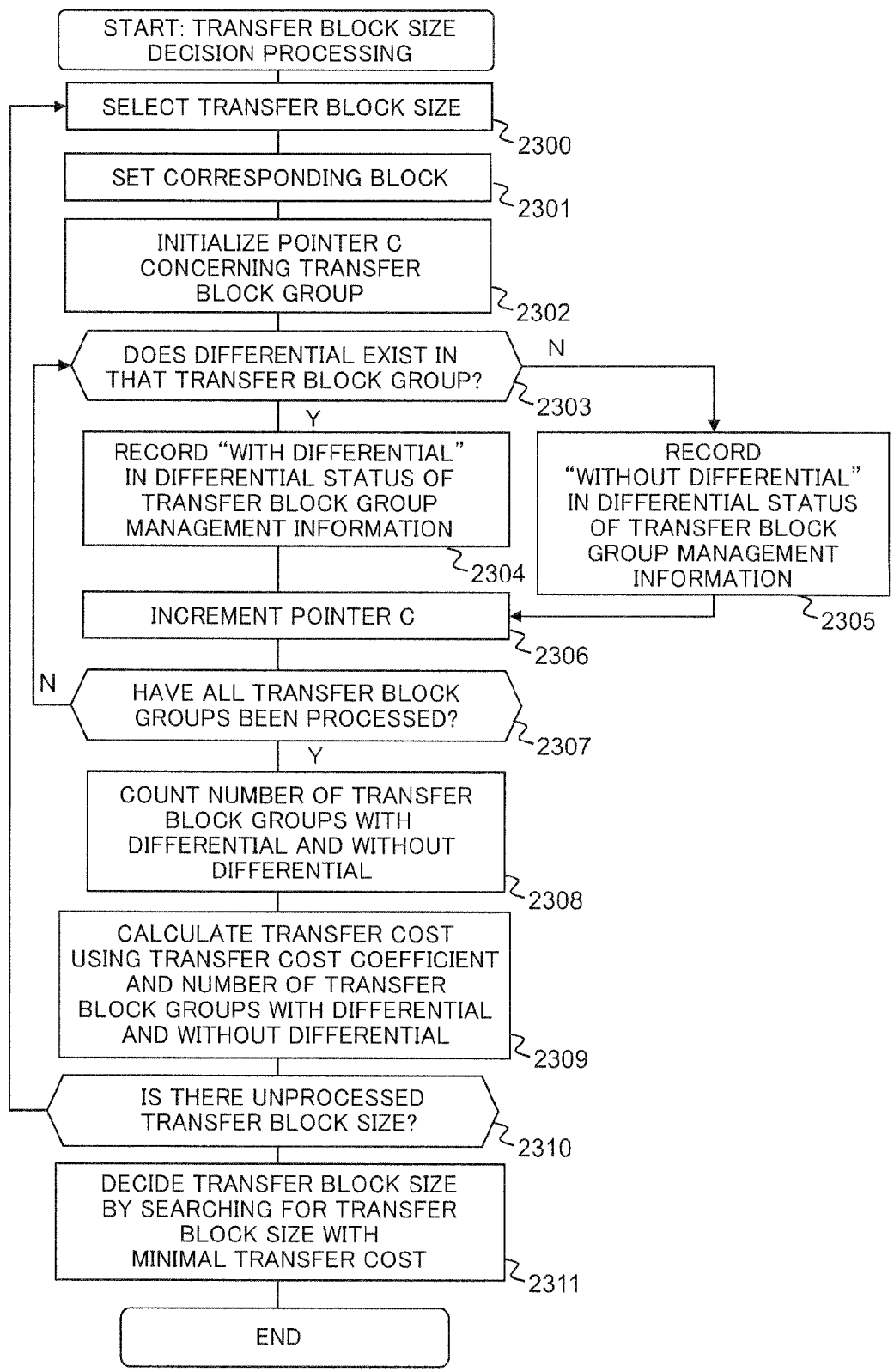
FIG. 23 is a diagram showing the processing flow of transfer block size decision processing.

At step 2009, the transfer block size decision processing 216 of FIG. 23 is executed to the processing unit block group designated with the pointer A. An optimal transfer block size can be obtained from this transfer block size decision processing 216.

Figure 21:
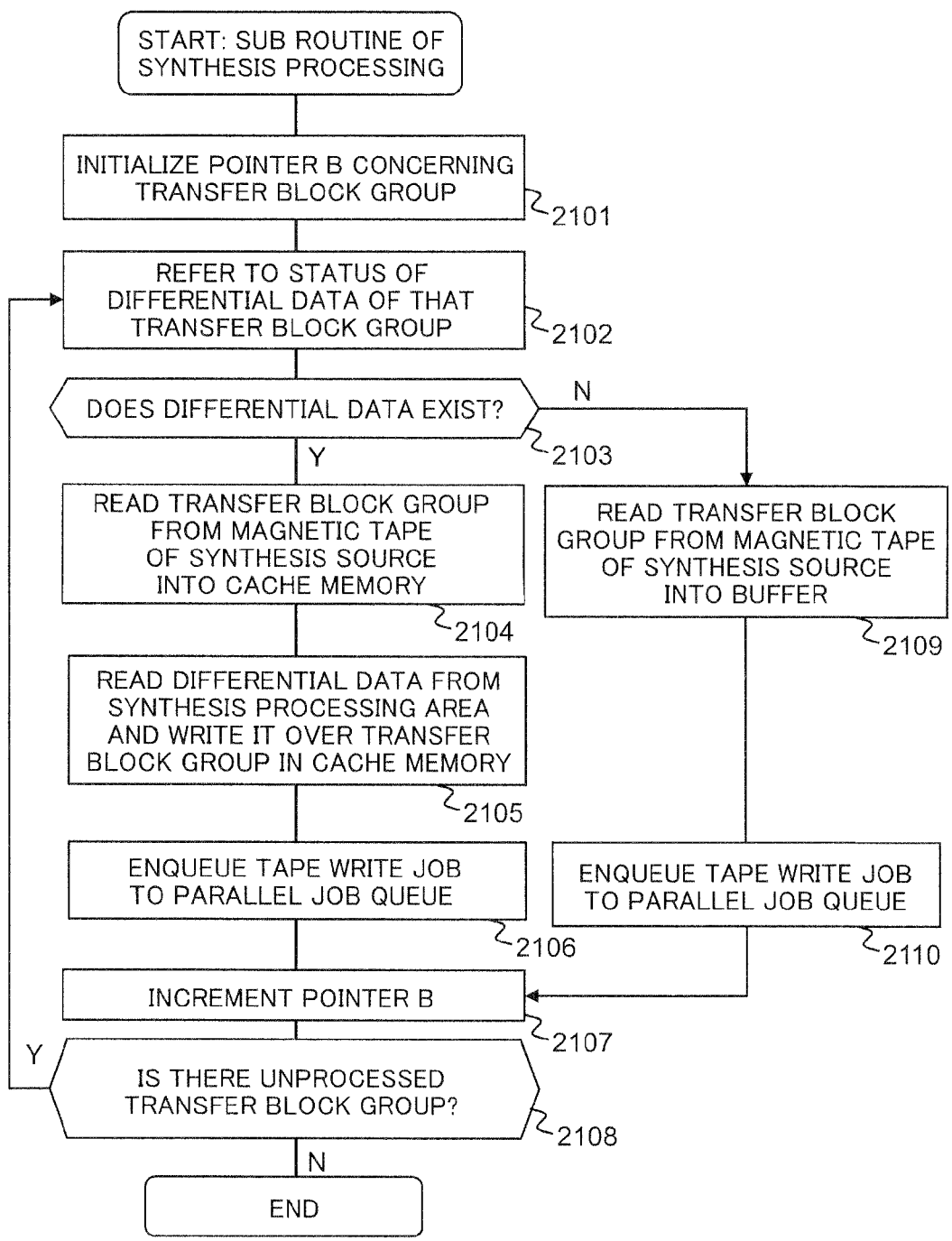
FIG. 21 is a diagram showing the processing flow of the sub routine of synthesis processing.

At step 2010, the sub routine of the synthesis processing 213 shown in FIG. 21 is executed to the processing unit block group designated with the pointer A. Here, the optimal transfer block size obtained at step 2009 is used. Based on the sub routine of the synthesis processing 213, the synthesis processing is performed to all transfer block groups contained in the processing unit block group.

At step 2011, the pointer A is incremented, and the next processing unit block group is pointed to the control processor 110. At step 2012, the control processor 110 determines whether all processing unit block groups in the magnetic tape have been processed, and proceeds to step 2013 if Yes, and proceeds to step 2009 if No.

At step 2013, the control processor 110 foremost sends a demount request to the library device 120, and demounts the magnetic tape 119 from the magnetic tape device 118 corresponding to the magnetic tape device number 1001 selected at step 2006.

Subsequently, the control processor 110 updates the usage status 1002 corresponding to the magnetic tape device number 1001 selected at step 2006 to "not in use." Subsequently, the control processor 110 sends a demount request to the library device 120, and demounts the magnetic tape 119 from the magnetic tape device 118 corresponding to the magnetic tape device number 1001 selected at step 2007.

Finally, the control processor 110 updates the usage status 1002 corresponding to the magnetic tape device number 1001 selected at step 2007 to "not in use."

At step 2014, the control processor 110 foremost checks the old full data management information 500, and acquires the magnetic tape number 502 corresponding to the magnetic disk device number 501 of the number "100." Subsequently, the control processor 110 updates the usage status 902 corresponding to the magnetic tape number 901 that is equivalent to the acquired magnetic tape number to "not in use."

Subsequently, the control processor 110 checks the new full data management information 700, and acquires the magnetic tape number 702 corresponding to the magnetic disk device number 701 that is equivalent to the number "100." Subsequently, the control processor 110 updates the magnetic tape number 502 corresponding to the magnetic disk device number 501 that is equivalent to the number "100" to the acquired magnetic tape number 702.

Subsequently, the control processor 110 updates the magnetic tape number 702 corresponding to the magnetic disk device number 701 that is equivalent to the number "100" to "NULL" in the new full data management information 700.

Subsequently, the control processor 110 checks the differential data management information 600, and acquires the magnetic tape number 602 corresponding to the magnetic disk device number 601 that is equivalent to the number "100." Subsequently, the control processor 110 refers to the magnetic tape management information 900, discovers the magnetic tape number 901 that is equivalent to the acquired magnetic tape number 602, and updates and sets the corresponding usage status 902 to "not in use."

Subsequently, the control processor 110 checks the differential data during synthesis processing management information 800, and acquires the magnetic tape number 802, the magnetic tape device number 803, and the block count 804 corresponding to the magnetic disk device number 801 that is equivalent to the number "100."

Subsequently, the control processor 110 refers to the differential data management information 600, updates the magnetic tape number 802 that acquired the magnetic tape number 602, updates the magnetic tape device number 803 that acquired the magnetic tape device number 603, and updates the block count 804 that acquired the block count 604 corresponding to the magnetic disk device number 601 that is equivalent to the number "100."

Subsequently, the control processor 110 refers to the differential data during synthesis processing management information 800, updates the magnetic tape number 802 corresponding to the magnetic disk device number 801 that is equivalent to the number "100" to "NULL," updates the magnetic tape device number 803 to "NULL," and updates the block count 804 to 0.

At step 2015, the control processor 110 refers to the operational status management information 1100, updates the operational status 1102 corresponding to the magnetic disk device number 1101 that is equivalent to the number "100" to "normal processing," and thereby ends the synthesis processing 213.

FIG. 21 shows the processing flow of the sub routine of the synthesis processing 213. This processing flow is called at step 2010 of FIG. 20. This processing flow is for performing the synthesis processing using the transfer block size that was designated in the synthesis processing regarding all blocks in the processing unit block group that was also designated in the synthesis processing. The data size of the transfer block group in this processing is equivalent to the transfer block size. Moreover, in processing, an entry in which the transfer block size 1301 is equivalent to this transfer block size is referred to regarding the transfer block group management information 1300.

At step 2101, the control processor 110 initializes the pointer B concerning the transfer block group with 0 representing the first transfer block group. At step 2102, the control processor 110 refers to the differential status 1304 of an entry including the transfer block group number 1302 corresponding to the transfer block group designated with the pointer B regarding the transfer block group management information 1300.

At step 2103, the control processor 110 proceeds to step 2104 if the differential status 1304 referred to at step 2101 is "1" showing "with differential," and proceeds to step 2109 if it is "0" showing "without differential."

At step 2104, the control processor 110 reads the transfer block group designated at step 2102 from the magnetic tape 119 of the synthesis source, which records the old full data and was mounted at step 2006, into the cache memory 122.

At step 2105, the control processor 110 reads the differential data in relation to the data in the transfer block group from the synthesis processing area 300, and writes such differential data over the corresponding data location in the transfer block group of the cache memory 122 that was read at step 2104.

Specifically, foremost, the control processor 110 refers to the corresponding block 1303 of the transfer block group management information 1300, and specifies the block corresponding to the transfer block group. Then, the control processor 110 refers to the differential status 1202 of the corresponding per-block differential management information 1200 in relation to each of the specified blocks, and, if "1" showing "with differential" is recorded, reads the data 124 of the block 301 in the corresponding synthesis processing area 300, and writes the read data 124 over the corresponding location in the transfer block group of the cache memory 122.

At step 2106, the control processor 110 enqueues the tape write job 1603 for writing the transfer block group in the cache memory 122 onto the magnetic tape 119 of the synthesis destination recording the new full data to the parallel job queue 1601 of the job management information 1600. The enqueued tape write job 1603 includes information capable of specifying the transfer block group of the cache memory 122.

At step 2107, the control processor 110 increments pointer B, and points out the next transfer block group. At step 2108, the control processor 110 determines whether all transfer block groups in the processing unit block group have been processed, and ends the sub routine of the synthesis processing 213 if all transfer block groups have been processed, and proceeds to step 2102 if all transfer block groups have not been processed.

At step 2109, the control processor 110 reads the transfer block group from the magnetic tape 119 of the synthesis source, which records the old full data and was mounted at step 2006, into the buffer 109a.

At step 2110, the control processor 110 enqueues the tape write job 1603 for writing the transfer block group in the buffer 109a onto the magnetic tape 119 of the synthesis destination recording the new full data to the parallel job queue 1601 of the job management information 1600. The enqueued tape write job 1603 includes information capable of specifying the transfer block group of the buffer 109a.

Figure 22:
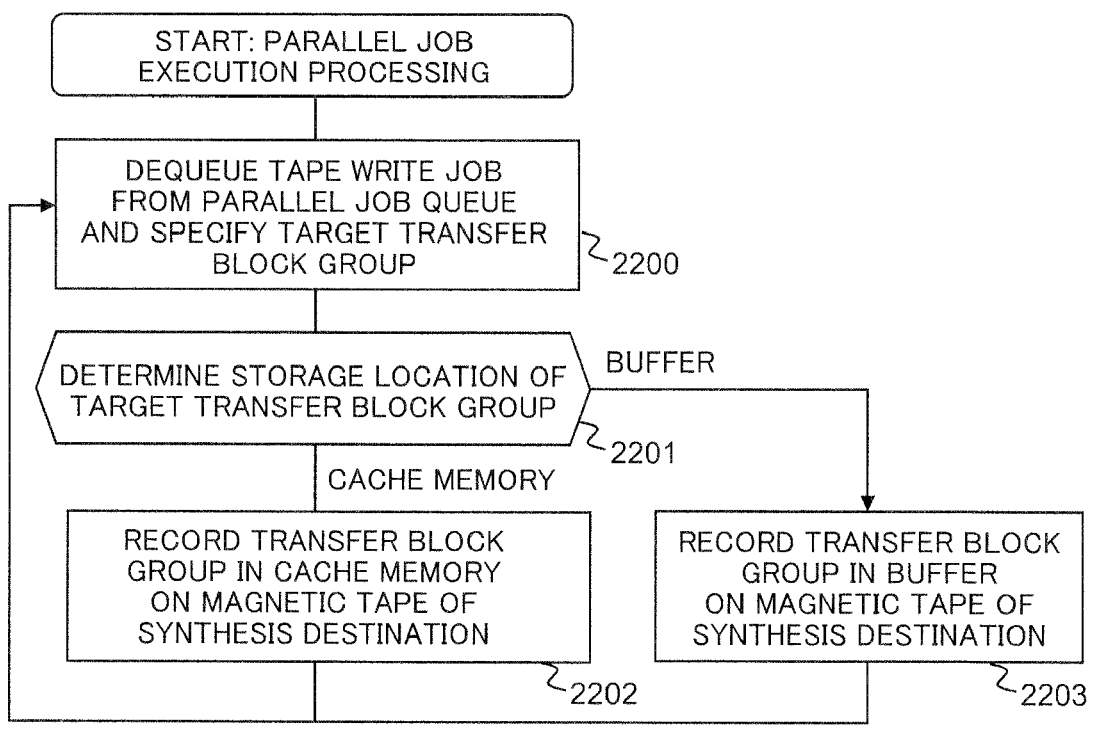
FIG. 22 is a diagram showing the processing flow of parallel job execution processing.

FIG. 22 shows the processing flow of the parallel job execution processing 215. At step 2200, the control processor 110 dequeues the tape write job 1603 from the parallel job queue 1601 of the job management information 1600, and specifies the transfer block group to be processed. The transfer block group to be processed is stored in the cache memory 122 or the buffer 109a.

At step 2201, the control processor 110 determines the storage location of the transfer block group to be processed, and proceeds to step 2202 if stored in the cache memory 122, and proceeds to step 2203 if stored in the buffer 109a.

At step 2202, the transfer block group to be processed stored in the cache memory 122 is recorded on the magnetic tape 119 of the synthesis destination which was mounted at step 2007 and which records the new full data.

At step 2203, the transfer block group to be processed stored in the buffer 109a is recorded on the magnetic tape 119 of the synthesis destination which was mounted at step 2007 and which records the new full data.

FIG. 23 shows the processing flow of the transfer block size decision processing 216. This processing is called from step 2009 of FIG. 20. In this processing, the transfer block group management information concerning a certain processing unit block group is created, and the optimal transfer block size upon transferring the blocks in the processing unit block group is decided.

The reason why the processing for deciding the optimal transfer block size is necessary is foremost explained. In a normal data transfer, the larger the transfer block size, the overhead will relatively becomes smaller regarding the various processing steps for processing a single transfer block group. Thus, the efficiency of data transfer is high. Meanwhile, the larger the transfer block size, the probability that differential data exists in a certain transfer block group will increase. In order to apply differential data to a transfer block group, since it is necessary to transfer data via the first transfer path, which is a low-speed data transfer in comparison to the second transfer path, there is a possibility that the speed of the overall data transfer may decrease. As described above, since there is a trade-off in the transfer block size, the execution efficiency of the synthesis processing and the transfer efficiency of data will fluctuate depending on the transfer block size. Thus, the processing for deciding the optimal transfer block size is necessary.

At step 2300, the control processor 110 foremost selects one transfer block size from a list of the transfer block sizes decided in the control apparatus 112 such as 4 blocks, 8 blocks, 16 blocks, and 32 blocks.

In the processing from steps 2301 to 2309, the processing unit block is divided for each transfer block size. The divided block group is referred to as a transfer block group. A transfer block group number such as 0, 1, 2, . . . is assigned in order from the top transfer block group. This transfer block group number corresponds to the transfer block group number 1302 in the transfer block group management information 1300.

At step 2301, the corresponding block 1303 is set in the entry of all transfer block group numbers 1302 in the transfer block size. For example, "blocks 0 to 3" (total of 4 blocks) are set as the corresponding blocks regarding the transfer block group number "0" having a transfer block size of "4 blocks." A similar setting is also performed for the transfer block group numbers 1, 2, 3, . . . .

At step 2302, the control processor 110 initializes the pointer C concerning the transfer block group with 0 representing the first transfer block group in the processing unit block group. At step 2303, the control processor 110 determines whether differential exists in the transfer block group designated by the pointer C. Specifically, by referring to the per-block differential management information 1200, the control processor 110 determines whether differential exists in a block in the corresponding block 1303 of the transfer block group, and if there is even one block with differential, sets "1" showing "with differential" in the differential status 1304 of the transfer block group management information 1300 corresponding to the transfer block group at step 2304, and, if there is not even one block with differential, sets "0" showing "without differential" in the differential status 1304 of the transfer block group management information 1300 corresponding to the transfer block group at step 2305.

At step 2306, the control processor 110 increments pointer C, and points out the next transfer block group. At step 2307, the control processor 110 determines whether all transfer block groups have been processed, and proceeds to step 2308 if Yes, and proceeds to step 2303 if No.

At step 2308, the control processor 110 counts the number of transfer block groups with differential and without differential regarding the transfer block size of the transfer block group management information 1300, and records this respectively in the transfer block group count with differential 1305, and the transfer block group count without differential 1306.

At step 2309, the control processor 110 calculates the transfer cost using the transfer cost coefficient and the number of transfer block groups with differential and without differential. Specifically, the transfer cost upon transferring data in the relevant transfer block size is calculated based on the following formula upon using the first transfer cost coefficient 1402 and the second transfer cost coefficient 1403 in the transfer cost coefficient management information 1400, and the transfer block group count with differential 1305 and the transfer block group count without differential 1306 in the transfer block group management information 1300:

"transfer cost"="first transfer cost coefficient"×"transfer block group count with differential"+"second transfer cost coefficient"×"transfer block group count without differential"

The transfer cost obtained from the calculation is recorded in the corresponding transfer cost 1502 of the transfer cost management information 1500.

At step 2310, the control processor 110 determines whether there is an unprocessed transfer block size in the transfer block size list, and proceeds to step 2300 if Yes, and proceeds to step 2310 if No.

At step 2311, the control processor 110 refers to the transfer cost management information 1500, and selects the transfer block size 1501 in which the transfer cost 1502 will be the lowest. The selected transfer block size 1501 is used as the processing result of the transfer block size decision processing 216.

Figure 24:
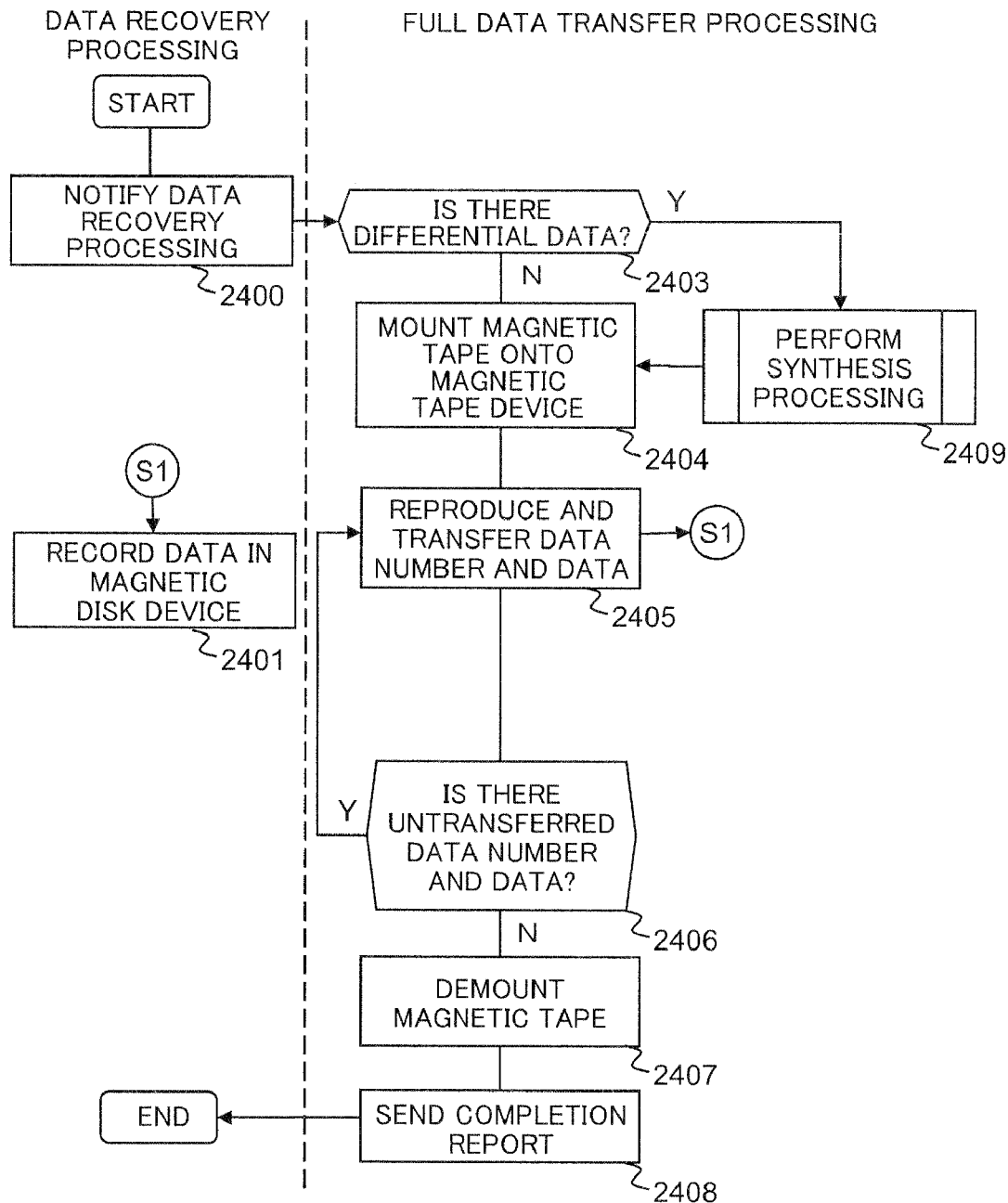
FIG. 24 is a diagram showing the processing flow of data recovery processing and full data transfer processing.

FIG. 24 is the processing flow of the data recovery processing 203 and the full data transfer processing 214. The data recovery processing 203 is started when a failure occurs in the magnetic disk device 102 and the magnetic disk device 102 needs to be replaced, or when the recorded data 124 is lost.

Here, in order to simplify the explanation, a specific case is explained where the data recovery processing 203 and the full data recovery processing 214 are performed to the magnetic disk device 102 that is identified with the number "100." If another magnetic disk device 102 is to be the target, the number "100" may be substituted with another number.

At step 2400, the control processor 106 notifies the start of data recovery processing to the control processor 110. Here, the number "100" identifying the magnetic disk device 102 is notified to the control processor 110.

When the control processor 110 receives the data recovery processing start notification from the control processor 106, it starts the full data transfer processing 214. At step 2403, the control processor 110 checks the differential data management information 600, and checks whether the block count 604 corresponding to the magnetic disk device number 601 that is equivalent to the number "100" is 0.

The control processor 110 proceeds to step 2404 if it is 0, and proceeds to step 2409 if it is not 0. At step 2404, the control processor 110 foremost checks the magnetic tape device management information 1000, selects one magnetic tape device number 1001 in which the usage status 1002 is "not in use," and sets the usage status 1002 corresponding to the selected magnetic tape device number 1001 to "in use."

Subsequently, the control processor 110 checks the old full data management information 500, acquires the magnetic tape number 502 corresponding to the magnetic disk device number 501 that is equivalent to the number "100," and calculates the magnetic tape 119 recording the full data of the magnetic disk device 102 that is identified with the number "100." Subsequently, the control processor 110 sends a mount request to the library device 120, and mounts the calculated magnetic tape 119 onto the magnetic tape device 118 corresponding to the selected magnetic tape device number 1001.

At step 2405, the control processor 110 foremost sends a reproduction request to the magnetic tape device 118 corresponding to the magnetic tape device number 1001 selected at step 2404, and reproduces the block 400 and stores it in the cache memory 122. Subsequently, the control processor 110 transfers the data number 123 and the data 124 configuring the block 400 stored in the cache memory 122 to the control apparatus 108. Upon receiving the data number 123 and the data 124 at step 2405, the control apparatus 108 records the data 124 in the storage area of the magnetic disk device 102 corresponding to the data number 123. At step 2406, the control processor 110 checks whether all blocks 400 have been reproduced from the magnetic tape 119, and proceeds to step 2407 if all blocks 400 have been reproduced, and proceeds to step 2405 if there is a block 400 that has not been reproduced.

At step 2407, the control processor 110 foremost sends a demount request to the library device 120, and demounts the magnetic tape 119 from the magnetic tape device 118 corresponding to the magnetic tape device number 1001 selected at step 2404.

Subsequently, the control processor 110 updates the usage status 1002 corresponding to the magnetic tape device number 1001 of the magnetic tape device management information 1000 that is equivalent to the magnetic tape device number 1001 selected at step 2404 to "not in use." At step 2408, the control processor 110 sends a completion report to the control processor 106, and thereby ends the full data transfer processing 214. The control processor 106 receives the completion report from the control processor 110, and thereby ends the data recovery processing 203.

At step 2409, the control processor 110 starts the synthesis processing 213 to the magnetic disk device 102 that is identified with the number "100." When the synthesis processing 213 is complete, since it will be a status without any differential data, the control processor 110 proceeds to step 2404.

The first embodiment was explained above, but the second transfer path in the first embodiment may also be configured the same as the first transfer path. In the foregoing case, both the second transfer path and the first transfer path will pass through the cache memory 122. Also in the foregoing case, the first transfer cost coefficient 1402 and the second transfer cost coefficient 1403 to a certain transfer block size 1401 will be the same value. Moreover, the buffer of step 2109 and step 2203 may be substituted with a cache memory.

The second embodiment differs in the following points when compared with the first embodiment.

Figure 25:
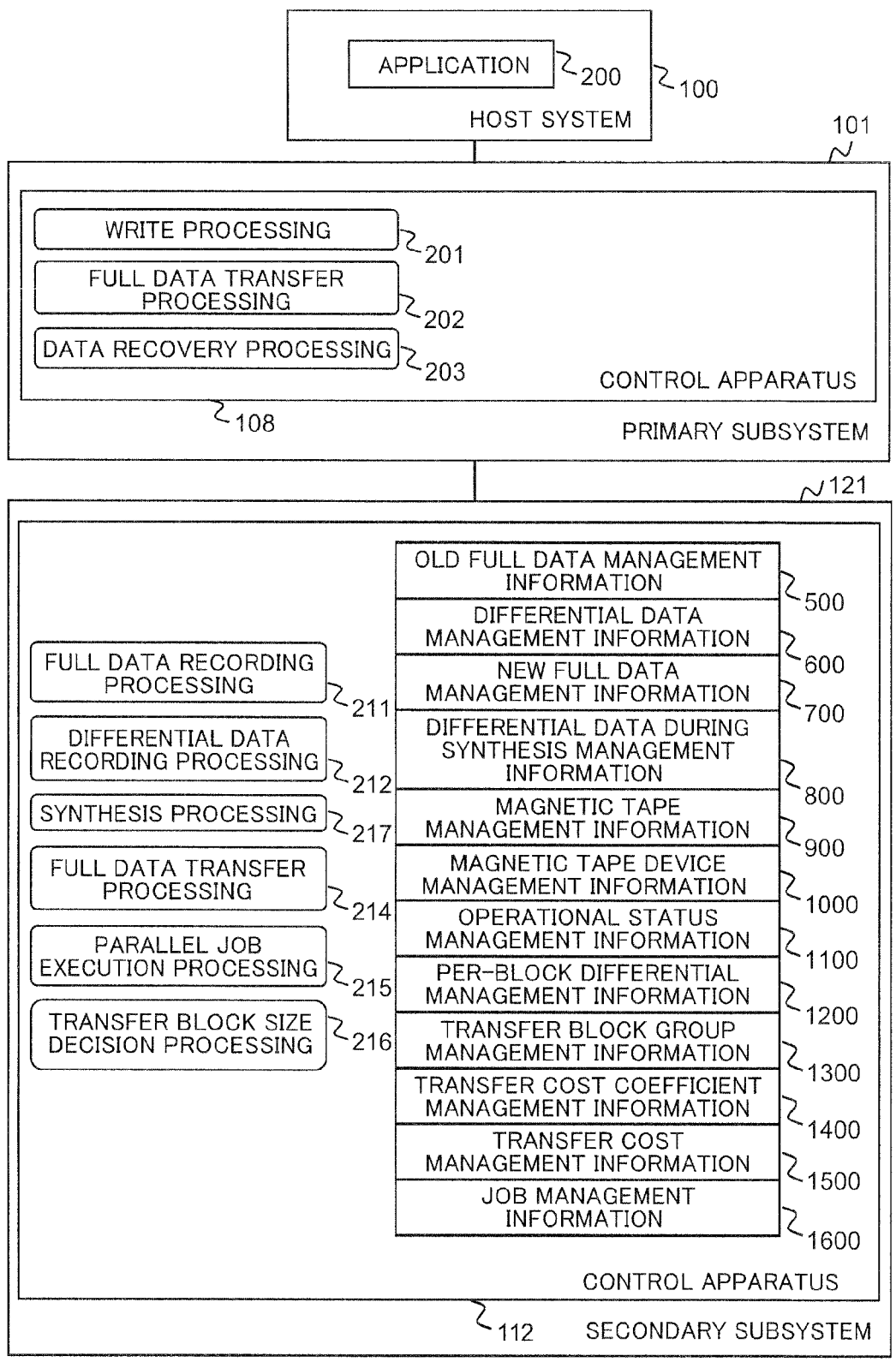
FIG. 25 is a program configuration diagram according to a second embodiment of the present invention.

Foremost, as shown in the program configuration diagram according to the second embodiment of FIG. 25, the difference is in that different synthesis processing 217 is executed in substitute for the synthesis processing 213 of the first embodiment. In the synthesis processing 217 of the second embodiment, the sub routine of the synthesis processing 217 shown in FIG. 26 is executed in substitute for the sub routine of the synthesis processing 213 shown in FIG. 21.

In addition, the second transfer path in the second embodiment differs from the first embodiment. In the first embodiment, the second transfer path was a transfer path that sequentially passed through the magnetic tape device 118 storing the magnetic tape of the synthesis source, the buffer 109a, and the magnetic tape device 118 storing the magnetic tape of the synthesis destination.

In the second embodiment, the magnetic tape device 118 directly transfers data to another magnetic tape device without going through the buffer; that is, the second transfer path is a transfer path that sequentially passes through the magnetic tape device storing the magnetic tape of the synthesis source, and the magnetic tape device storing the magnetic tape of the synthesis destination, and differs from the first embodiment in that it does not pass through the buffer 109a. The magnetic tape device 118 of the second embodiment receives a data transfer command from the control processor 110 for transferring data to another magnetic tape device, and, after executing such data transfer, sends a completion report to the control processor 110.

Figure 26:
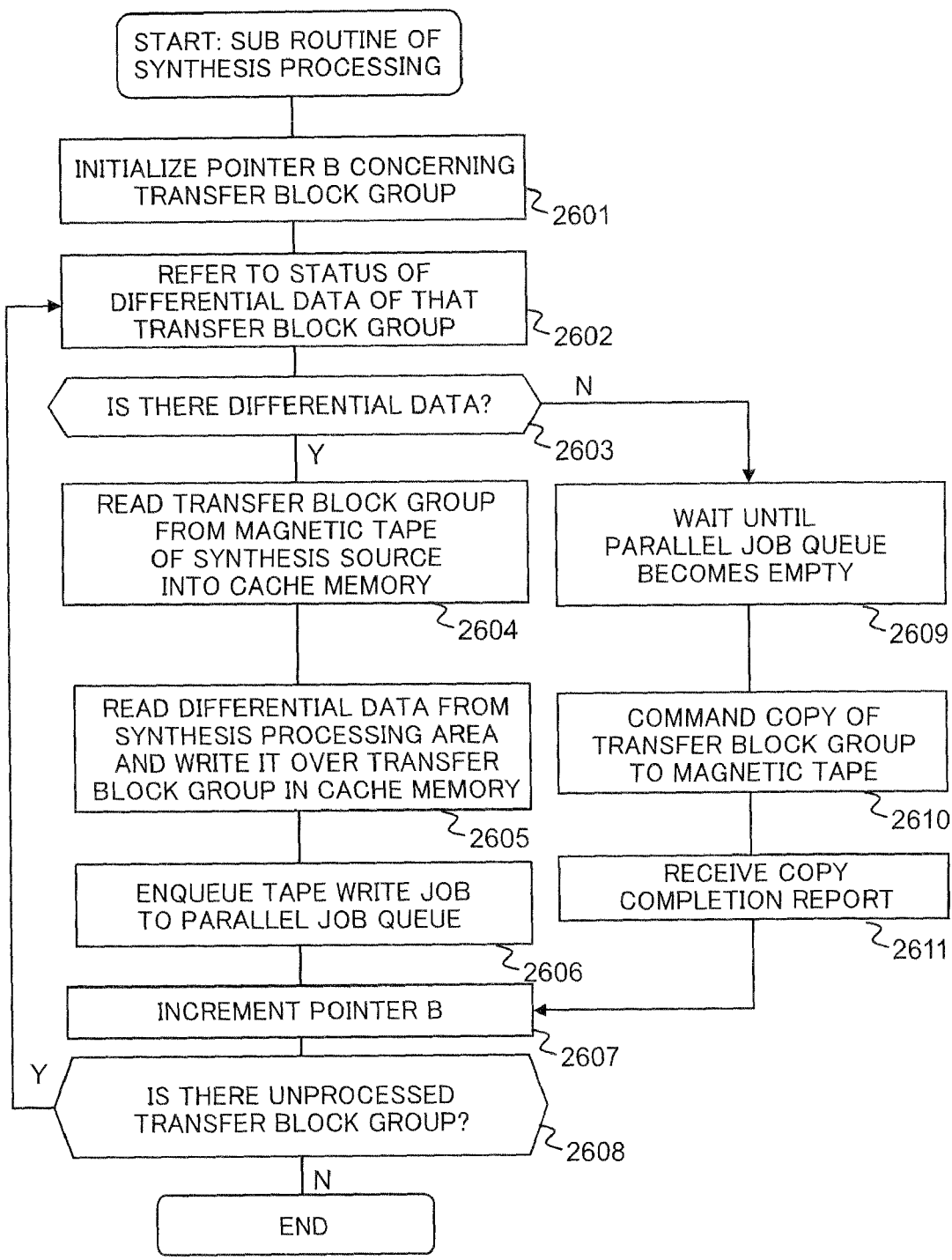
FIG. 26 is a diagram showing the processing flow of a sub routine of synthesis processing according to the second embodiment of the present invention.

The processing flow of the sub routine of the synthesis processing 217 shown in FIG. 26 is now explained. Steps 2601 to 2608 of FIG. 26 are the same as steps 2001 to 2008 of FIG. 20.

At step 2609, the control processor 110 waits for the parallel job queue 1601 of the job management information 1600 to become empty. The reason why it is necessary to wait for the parallel job queue 1601 to become empty is foremost explained. At step 2610, since the transfer block group is copied from the magnetic tape 119 of the synthesis source recording the old full data to the magnetic tape 119 of the synthesis destination recording to the new full data, the process of writing such data onto the magnetic tape 119 of the synthesis destination recording the new full data will arise.

In order to write data in the proper order onto the magnetic tape 119 of the synthesis destination recording the new full data, such writing must not pass the writing of the tape write job 1603 that is accumulated in the parallel job queue 1601.

As a result of waiting for the parallel job queue 1601 to become empty, it is possible to guarantee that all tape write job 1603 accumulated in the parallel job queue 1601 will be executed, and it is thereby possible to write data in the proper order onto the magnetic tape 119 of the synthesis destination recording the new full data.

At step 2610, the control processor 110 issues a command to the magnetic tape device 118 of the synthesis source selected at step 2006 so as to transfer the transfer block group from the magnetic tape of the synthesis source 119 recording the old full data to the magnetic tape 119 of the synthesis destination recording the new full data.

At step 2611, the control processor 110 receives a completion report from the magnetic tape device 118 of the synthesis source that transferred the transfer block group.

INDUSTRIAL APPLICABILITY

As explained above, the present invention is able to provide a storage system and a data storage method capable of shortening the time required for synthesizing the full data with differential data even upon applying a sequential access-type storage apparatus to a memory medium to be used in the backup or restoration of the full data stored in a random access-type storage apparatus.

The invention claimed is:
1. A storage system, comprising:
a sequential access-type first memory device for storing first backup data;
a second memory device for storing differential data;
a third memory device for storing second backup data in which differential data is synthesized with the first backup data;
a control circuit for sequentially reading the first backup data from the first memory device, and synthesizing differential data with the read data; and
a first memory circuit;

wherein, if differential data exists in the read data, the control circuit writes the read data into the first memory circuit, synthesizes the differential data with the data stored in the first memory circuit, and writes the synthesized data into the third memory device; and wherein, if differential data does not exist in the read data, the control circuit writes the read data into the third memory device without going through the first memory circuit reads data from the first memory device and writes data into the third memory device in parallel, wherein the second memory device and the third memory device are respectively configured from a sequential access-type memory device;

wherein a second memory circuit is provided within an interface circuit to the first to third memory devices;

wherein, if differential data exists in the read data, the control circuit once writes the read data into the second memory circuit, subsequently writes the written data from the second memory circuit into the first memory circuit and synthesizes it with the differential data, and thereafter stores the synthesized data in the third memory device, and if differential data does not exist in the read data, the control circuit once writes the read data into the second memory circuit, and subsequently stores the written data in the third memory device;

wherein the first to the third memory devices as the sequential access-type memory device are respectively configured from a magnetic tape and a magnetic tape device for driving the magnetic tape;

wherein the storage system further comprises a random access-type fourth memory device;

wherein the control circuit sequentially reads the differential data from the second memory device and writes it into the fourth memory device, randomly reads the differential data from the fourth memory device and applies it to the data written into the first memory circuit;

wherein the first backup data is configured from a plurality of blocks;

wherein the storage system further comprises a control memory storing information for managing whether differential data exists in each of the plurality of blocks;

wherein the control circuit refers to the control memory and synthesizes the data read from the first backup data with the differential data;

wherein the control circuit comprises a queue of an FIFO structure for sequentially registering a write job of the data in the third memory device;

wherein the control circuit sequentially reads the first backup data from the first memory device while sequentially executing the job written into the queue; and wherein the control apparatus decides size of data among the first backup data to be transferred from the first memory device so as to optimize the total of a first data size transfer efficiency to be applied to the differential data among the first backup data and a second data size transfer efficiency to which the differential data among the backup data is not applied.

2. The storage system according to claim 1, wherein the second memory device and the third memory device are respectively configured from a sequential access-type memory device;

wherein the storage system further comprises a second memory circuit; and wherein, if differential data exists in the read data, the control circuit once writes the read data into the second memory circuit, subsequently writes the written data from the second memory circuit into the first memory circuit and synthesizes it with the differential data, and thereafter stores the synthesized data in the third memory device, and if differential data does not exist in the read data, the control circuit once writes the read data into the second memory circuit, and subsequently stores the written data in the third memory device.

3. The storage system according to claim 2, wherein the first to the third memory devices as the sequential access-type memory device are respectively configured from a magnetic tape and a magnetic tape device for driving the magnetic tape.

4. The storage system according to claim 2, further comprising a random access-type fourth memory device;

wherein the control circuit sequentially reads the differential data from the second memory device and writes it into the fourth memory device, randomly reads the differential data from the fourth memory device and applies it to the data written into the first memory circuit.

5. The storage system according to claim 1, wherein the first backup data is configured from a plurality of blocks;

wherein the storage system further comprises a control memory storing information for managing whether differential data exists in each of the plurality of blocks; and wherein the control circuit refers to the control memory and synthesizes the data read from the first backup data with the differential data.

6. The storage system according to claim 1, wherein the control circuit comprises a queue of an FIFO structure for sequentially registering a write job of the data in the third memory device; and wherein the control circuit sequentially reads the first backup data from the first memory device while sequentially executing the job written into the queue.

7. The storage system according to claim 2, wherein, if differential data does not exist in the read data, the control circuit writes the read data directly into the third memory device without going through the second memory circuit.

8. The storage system according to claim 5, wherein the control apparatus refers to the control memory and decides an optimal size of data among the first backup data to be transferred from the first memory device.

9. The storage system according to claim 8, wherein the control apparatus decides size of data among the first backup data to be transferred from the first memory device so as to optimize the total of a first data size transfer efficiency to be applied to the differential data among the first backup data and a second data size transfer efficiency to which the differential data among the backup data is not applied.

10. The storage system according to claim 1, wherein the third memory device is configured from a sequential access-type memory device;

wherein the storage system further comprises a second memory circuit; and wherein, if differential data does not exist in the read data, the control circuit once writes the read data into the second memory circuit, and subsequently stores the written data into the third memory device.

11. The storage system according to claim 1, wherein the second memory device and the third memory device are respectively configured from a sequential access-type memory device;

wherein the first memory circuit is a cache memory;

wherein the control circuit includes:

a first circuit for controlling input and output of data to and from the cache memory; and a second circuit for controlling input and output of data to and from a buffer existing in an interface circuit with the first to third memory devices;

wherein, if differential data does not exist in data read from the first memory device into the buffer, the second circuit transfers the read data from the buffer to the third memory device, and, if differential data exists in the data read from the first memory device into the buffer, the second circuit transfers the read data from buffer to the cache memory;

wherein the first circuit synthesizes the differential data with the data that was transferred to the cache memory; and wherein the second circuit transfers the synthesized data to the third memory device via the buffer.

* * * * *